US011448411B2

(12) United States Patent
Malcolm et al.

(10) Patent No.: US 11,448,411 B2
(45) Date of Patent: Sep. 20, 2022

(54) SMART THERMOSTAT ORCHESTRATION

(71) Applicant: Encycle Corporation, Toronto (CA)

(72) Inventors: Peter Bryan Malcolm, Woodstock (GB); Mark Howard Kerbel; Paul Stidworthy, Cullompton (GB)

(73) Assignee: ENCYCLE CORPORATION

( * ) Notice: Subject to any disclaimer, the term of this patent is extended or adjusted under 35 U.S.C. 154(b) by 0 days.

(21) Appl. No.: 16/987,343

(22) Filed: Aug. 6, 2020

(65) Prior Publication Data
US 2020/0408431 A1 Dec. 31, 2020

Related U.S. Application Data

(63) Continuation of application No. 16/789,253, filed on Feb. 12, 2020, now Pat. No. 10,767,883, which is a
(Continued)

(51) Int. Cl.
*F24F 11/46* (2018.01)
*F24F 11/63* (2018.01)
(Continued)

(52) U.S. Cl.
CPC .............. *F24F 11/46* (2018.01); *F24F 11/52* (2018.01); *F24F 11/54* (2018.01); *F24F 11/58* (2018.01);
(Continued)

(58) Field of Classification Search
CPC .. F24F 11/46; F24F 11/59; F24F 11/61; F24F 11/64; F24F 11/65; F24F 11/52;
(Continued)

(56) References Cited

U.S. PATENT DOCUMENTS

2009/0195349 A1* 8/2009 Frader-Thompson ....................... G01D 4/002 340/3.1
2009/0240381 A1* 9/2009 Lane .......................... H02J 3/14 700/296

(Continued)

*Primary Examiner* — Sheikh Maruf
(74) *Attorney, Agent, or Firm* — B. Rhiannon Adams; Rodman & Rodman LLP

(57) ABSTRACT

Systems and methods for orchestrating the operation of energy-consuming loads, so as to minimize power consumption, are described. In some embodiments, the loads can be HVAC, refrigeration systems, air compressors, and the like, and orchestration is effected either directly or by means of the loads' respective controllers. In some aspects, the controllers can be Smart Thermostats and orchestration is effected through a Cloud-based orchestration platform or "COP." In certain aspects, a COP uses specifically programmed application programming interfaces, or APIs, to control the operation of a single manufacturer's Smart Thermostats, where the manufacturer provides its own Cloud-based control platform, through which the COP operates. The COP can similarly orchestrate the operation of two or more manufacturers' Smart Thermostats through their respective Cloud-based control platforms. By these and other means, the operation of a variety of energy-consuming loads can be more easily and efficiently orchestrated.

16 Claims, 13 Drawing Sheets

Related U.S. Application Data continuation of application No. 14/814,294, filed on Jul. 30, 2015, now Pat. No. 10,605,474.

(60) Provisional application No. 62/089,117, filed on Dec. 8, 2014.

(51) Int. Cl.

| | | |
|---|---|---|
| *G05D 23/19* | (2006.01) | |
| *F24F 11/58* | (2018.01) | |
| *H02J 3/14* | (2006.01) | |
| *F24F 11/64* | (2018.01) | |
| *F24F 11/65* | (2018.01) | |
| *F24F 11/52* | (2018.01) | |
| *F24F 11/54* | (2018.01) | |
| *G05B 19/042* | (2006.01) | |
| *F24F 11/59* | (2018.01) | |
| *F24F 11/61* | (2018.01) | |
| *H02J 3/38* | (2006.01) | |
| *H02J 3/32* | (2006.01) | |
| *F24F 140/60* | (2018.01) | |
| *F24F 140/50* | (2018.01) | |
| *F24F 130/00* | (2018.01) | |
| *F24F 110/10* | (2018.01) | |
| *F24F 110/12* | (2018.01) | |

(52) U.S. Cl.
CPC ............. *F24F 11/59* (2018.01); *F24F 11/61* (2018.01); *F24F 11/63* (2018.01); *F24F 11/64* (2018.01); *F24F 11/65* (2018.01); *G05B 19/042* (2013.01); *G05D 23/1917* (2013.01); *G05D 23/1919* (2013.01); *H02J 3/14* (2013.01); *F24F 2110/10* (2018.01); *F24F 2110/12* (2018.01); *F24F 2130/00* (2018.01); *F24F 2140/50* (2018.01); *F24F 2140/60* (2018.01); *G05B 2219/2614* (2013.01); *H02J 3/32* (2013.01); *H02J 3/38* (2013.01); *H02J 3/382* (2013.01); *H02J 2310/14* (2020.01)

(58) Field of Classification Search
CPC .. F24F 11/54; F24F 11/63; F24F 11/58; F24F 2130/00; F24F 2110/10; F24F 2110/12; F24F 2140/60; F24F 2140/50; G05B 19/042; G05B 2219/2614; H02J 3/14; H02J 3/38; H02J 2310/14; H02J 3/382; H02J 3/32; H02J 3/381; H02J 2300/20; G05D 23/1919; G05D 23/1917; Y02B 70/3225; Y02B 70/30; Y04S 20/244; Y04S 20/222; Y02P 80/10

USPC ........................................................ 700/278
See application file for complete search history.

(56) References Cited

U.S. PATENT DOCUMENTS

| | | | |
|---|---|---|---|
| 2009/0302994 A1* | 12/2009 | Rhee ................ | H02J 13/00026 340/3.1 |
| 2010/0069035 A1* | 3/2010 | Johnson ............. | H04L 41/0816 455/404.1 |
| 2010/0088261 A1* | 4/2010 | Montalvo ................ | H02J 3/14 706/15 |
| 2010/0286937 A1* | 11/2010 | Hedley .................. | G06Q 50/06 702/60 |
| 2011/0004355 A1* | 1/2011 | Wang .................. | H02J 13/0004 700/286 |
| 2011/0046792 A1* | 2/2011 | Imes ....................... | H02J 3/382 700/278 |
| 2011/0071695 A1* | 3/2011 | Kouroussis ............... | H02J 3/01 700/295 |
| 2011/0246606 A1* | 10/2011 | Barbeau .................. | H04L 67/02 709/217 |
| 2013/0076033 A1* | 3/2013 | Zachary ............. | F24D 11/0285 290/2 |
| 2013/0304272 A1* | 11/2013 | Schaut ............. | H02J 13/00028 700/295 |
| 2015/0054063 A1* | 2/2015 | Karda ............... | H01L 27/10873 257/329 |
| 2015/0097154 A1* | 4/2015 | Kim .................... | H01L 27/2481 257/5 |
| 2015/0102280 A1* | 4/2015 | Lee ....................... | H01L 45/146 257/4 |
| 2015/0123066 A1* | 5/2015 | Gealy ................. | H01L 27/2463 257/4 |
| 2015/0129824 A1* | 5/2015 | Lee ..................... | H01L 27/2481 257/2 |
| 2015/0200202 A1* | 7/2015 | Karda ................ | H01L 29/0603 438/283 |
| 2015/0248931 A1* | 9/2015 | Nazarian ................ | G11C 11/56 438/238 |
| 2015/0340610 A1* | 11/2015 | Jung ................... | H01L 27/2463 257/4 |
| 2016/0005961 A1* | 1/2016 | Ino ..................... | H01L 45/1253 257/295 |
| 2016/0018126 A1* | 1/2016 | Kolk ....................... | F24F 11/70 700/278 |
| 2016/0043143 A1* | 2/2016 | Sakotsubo .......... | H01L 27/2481 257/4 |
| 2017/0082310 A1* | 3/2017 | Keshmeshian .......... | G01K 3/10 |
| 2017/0167742 A1* | 6/2017 | Radovanovic ........... | F24F 11/70 |
| 2017/0279273 A1* | 9/2017 | Tischer .................... | H02J 3/00 |
| 2018/0151946 A1* | 5/2018 | Grohman .......... | H04M 1/72454 |

\* cited by examiner

FIG. 3

Table 1 – Cloud Services (30)

| ID | Protocol | Address |
|---|---|---|
| S1 | A | https://api1.abcmfr.com |
| S2 | A | https://api2.abcmfr.com |
| S3 | B | https://api1.xyzmfr.com |

Table 2 – Smart Thermostat Devices: (31)

| ID | Name | Load | Group | Locale | Service | Credentials |
|---|---|---|---|---|---|---|
| T1 | Entrance Lobby | 10kW | G1 | L1 | S1 | myaccount\|mysecret |
| T2 | Bar | 10kW | G1 | L2 | S1 | myaccount\|mysecret |
| T3 | Dining Room Window | 15kW | G1 | L3 | S3 | youraccount\|yoursecret |
| T4 | Dining Room Rear | 10kW | G1 | L3 | S3 | youraccount\|yoursecret |
| T5 | Private Dining Room | 5kW | G2 | L4 | S1 | myaccount\|mysecret |

Table 3 – Group Program: (32)

| Group | Days | Time | Set Point |
|---|---|---|---|
| G1 | .TWTFSS | 11:30am | 72 |
| G1 | .TWTFSS | 3:00pm | 85 |
| G1 | .TWTFSS | 6:00pm | 72 |
| G1 | .TWTFSS | 10:00pm | 85 |
| G1 | MTWTFSS | 0:00am | 85 |
| G2 | MTWTFSS | 0:00am | 85 |

Table 4 – Smart Thermostat State Data: (33)

| ID | Timestamp | Set Point | Reading | Rate of Change | State |
|---|---|---|---|---|---|
| T1 | 02/28/14 13:23:01 | 72 | 75 | -10 | Cooling On |
| T2 | 02/28/14 13:33:54 | 72 | 72 | 5 | Cooling Off |
| T3 | 02/28/14 13:29:44 | 72 | 74 | -6 | Cooling On |
| T4 | 02/28/14 13:36:19 | 72 | 73 | -3 | Cooling On |
| T5 | 02/28/14 13:34:21 | 85 | 82 | 3 | Cooling Off |

Command "Get Bar Temperature"

Service for "Bar" is "S1", Credentials are "myaccount|mysecret"

Protocol for "S1" is "A", Address is "https://api1.abcmfr.com"

Temperature = "72"

FIG. 7

Table 5 – Simple Ranking

Calculation: Reading – Set Point

Ranked Table:

| ID | Set Point | Reading | Reading – Set Point |
|---|---|---|---|
| T1 | 72 | 75 | 3 |
| T3 | 72 | 74 | 2 |
| T4 | 72 | 73 | 1 |
| T2 | 72 | 72 | 0 |
| T5 | 85 | 82 | -3 |

Table 6 – Time to Set Point Ranking

Calculation: ( Reading – Set Point ) / ( Rate of Change* / 60)

* Absolute value (negative values considered positive)

Ranked Table:

| ID | Set Point | Reading | Rate of Change | Time to Set Point |
|---|---|---|---|---|
| T3 | 72 | 74 | -6 | 20 |
| T4 | 72 | 73 | -3 | 20 |
| T1 | 72 | 75 | -10 | 18 |

FIG. 8

Table 7 – Rates of Change Calling and Not Calling

| ID | Timestamp | Set Point | Reading | Rate of Change Calling | Rate of Change Not Calling |
|---|---|---|---|---|---|
| T1 | 09/24/14 15:58:44 | 85 | 77 | -6.7 | 0.9 |
| T2 | 09/24/14 15:49:06 | 85 | 77 | -6.9 | 1.1 |
| T3 | 09/24/14 15:51:54 | 85 | 78 | -4.9 | 1.2 |
| T4 | 09/24/14 15:47:13 | 85 | 76 | -5.9 | 0.8 |
| T5 | 09/24/14 15:47:21 | 85 | 82 | -4.2 | 0.2 |

Table 8 – Current Billing Period Demand Information

| Period Begins | 09/01/14 00:00:00 |
|---|---|
| Period Ends | 09/30/14 23:59:59 |
| Maximum Demand | 35kW |

Table 9 – Demand Management Evaluation

| ID | Load | Future Set Point | Reading | Rate of Change Calling | Rate of Change Not Calling |
|---|---|---|---|---|---|
| T1 | 10kW | 72 | 80 | -10.05 | 0.72 |
| T2 | 10kW | 72 | 78 | -10.35 | 0.88 |
| T3 | 15kW | 72 | 82 | -7.35 | 0.96 |
| T4 | 10kW | 72 | 80 | -8.85 | 0.64 |

FIG. 10
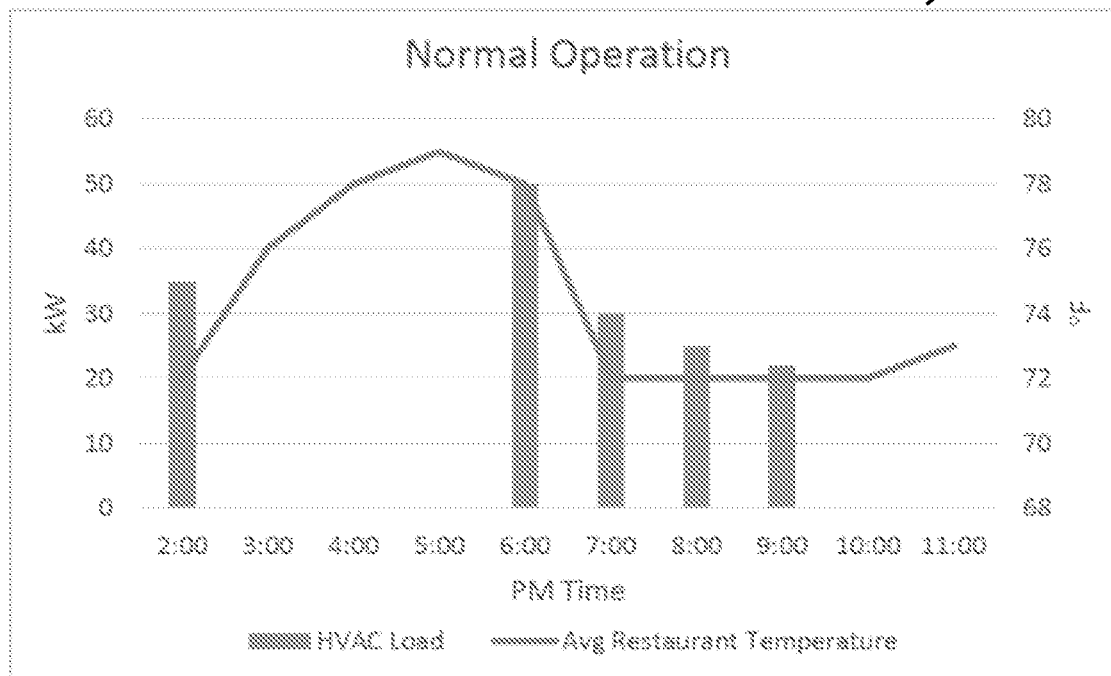
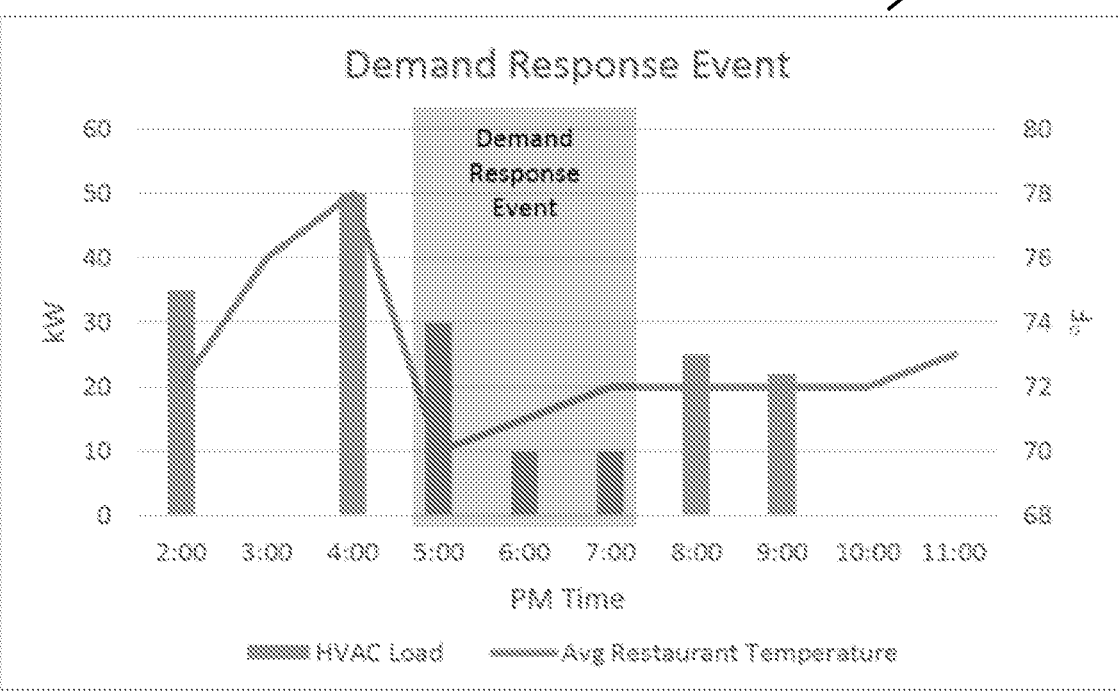

SMART THERMOSTAT ORCHESTRATION

This application is a continuation of Ser. No. 16/789,253 filed Feb. 12, 2020, and now allowed, which is a continuation of Ser. No. 14/814,294, filed Jul. 30, 2015, now U.S. Pat. No. 10,605,474 dated Mar. 31, 2020, which claims the priority of Provisional Application No. 62/089,117 filed Dec. 8, 2014.

TECHNICAL FIELD

Methods, apparatus, and systems for orchestrating the operation of a group of smart thermostats and for managing a smart Thermostat in a group of Smart Thermostats are described.

BACKGROUND OF THE INVENTION

The traditional electrical thermostat, designed for use as a control device in heating and cooling systems, dates back to the 1880s. Originally based on a bimetallic strip, it was perhaps epitomized by the Honeywell T87 model introduced in 1953. Electrical thermostats provide means for a user to set a desired temperature, known as the "Set Point." The electrical contacts are closed until the actual ambient temperature sensed by the thermostat is reached, when the electrical contacts are opened. Thus, in a heating system the heating apparatus is powered until the Set Point is reached, and in a cooling system the cooling apparatus is powered until the Set Point is reached. Where both heating and cooling systems are employed, the thermostat typically operates in either heating or cooling mode, but not both, according to a user setting.

The first digital thermostats, featuring a solid state design with no moving parts (except for a mechanical relay), were introduced in the mid-1980s. Digital thermostats were programmable, such that different Set Points could be applied at different times of the day (the "Program"). Programming capabilities increased over the following decades, allowing different Programs to apply on different days of the week as well as, for example, the ability to set a vacation mode where only a low minimum, or high maximum temperature would be maintained.

All thermostats, whether mechanical or digital, have a differential between the temperature at which the electrical contacts open and close. This differential, known as hysteresis, is inherent in a mechanical thermostat; in a digital thermostat this behaviour is enforced so that small changes in temperature around the Set Point do not cause the heating or cooling system to repeatedly turn on and off on a very short timescale, known as "short-cycling", which is both inefficient and causes unnecessary wear on mechanical components. In a digital thermostat either the ambient temperature is required to rise or fall past the Set Point by a small amount, typically about one degree of temperature, before the contacts open or close; alternatively, the thermostat enforces a minimum time for which the contacts must remain open or closed, typically about five minutes. In June, 1997 the Gas Research Institute filed for and received a patent (U.S. Pat. No. 5,926,776) on a thermostat having two-way communication capability. This class of thermostats has become known as "smart thermostats."

In the early 2000s, thermostats having wireless communication capabilities appeared, allowing the temperature sensor to be positioned in more convenient locations remotely from the Set Point control, and in 2011 the first Nest Learning Thermostat® was introduced. This thermostat, in addition to being aesthetically pleasing, included various energy saving features, including a motion sensor to determine if the area in the vicinity of the thermostat was occupied, and means to determine the expected local weather conditions. The thermostat was user adjustable and programmable not only with controls on the thermostat itself, but also remotely using a Web browser or smartphone application. The Nest Learning Thermostat® also was programmed to "learn" directly from the user's behaviour how to schedule the heating and air conditioning system to most efficiently meet the user's use patterns and lifestyle.

Other manufacturers have subsequently introduced smart thermostats designed to directly compete with Nest. Such thermostats typically use Wi-Fi local area wireless networking technology to communicate with a portable user device. This is typically accomplished using the same device the user normally uses for wireless Internet connectivity, such as their laptop or tablet computer, smartphone, and other such devices. This capability allows the user to control their smart thermostat, not only while they are located in the user's home or business, but from virtually any location where a connection to the Internet is available. To facilitate this remote control capability, the smart thermostat manufacturer, or their agent, typically operates an Internet (or "Cloud") based service that provides a user-friendly interface with the thermostat. To control the thermostat remotely, the user typically connects to the Cloud service which then communicates with the thermostat. The Cloud service typically also independently communicates with the thermostat periodically to provide it with, for example, weather data or software updates.

Using the Cloud service, typically accessed using a Web browser, the Cloud-based user interface typically allows the user to access all of the Smart Thermostats installed in their home or business, and select which of them they wish to monitor, control, or program at any time of their choosing. However, each of the user's Smart Thermostats are typically controlled or programmed completely independently of each other.

Programming, that is creating or modifying a Program for individual digital thermostats (including Smart Thermostats), is generally a tedious and error prone task, requiring the user to press a small number of individual buttons on the thermostat in strict sequence to achieve the desired result. Smart Thermostats typically make the task easier by allowing the Program to be set through the Web browser or smartphone application using a more intuitive graphical user interface. In some cases the application can copy the same Program to multiple Smart Thermostats; nevertheless, each thermostat must still be set individually. When different models or makes of thermostats are involved, different Programs are required, which further compounds the programming difficulty.

In normal operation users often wish to adjust the current Set Point of a thermostat, particularly as individual humans often have different perceptions of the temperature at any given time according to their mood, wellbeing, and other factors. Moreover, it is very common for someone who "feels hot" or "feels cold" to adjust a thermostat's Set Point well beyond what is actually necessary, in the (usually mistaken) belief that the desired temperature will be reached more quickly. Only when the ambient temperature becomes extreme will this error be noticed and the Set Point adjusted again; meanwhile energy has been unnecessarily wasted through over-heating or over-cooling. Smart Thermostat manufacturers have addressed this problem by providing the ability to "lock" the thermostat such that a password or PIN number is required to adjust it. Some Smart Thermostats allow adjustment of the Set Point within a limited range, but require a password or PIN number to make any other changes. Typically, a Smart Thermostat will consider user changes to the Set Point to be temporary, reverting to the Program Set Point when the time for the next Program change is reached.

Thermostat Programs normally operate on the basis of a fixed timetable of Set Points, typically for given days of the week. In the case of the Nest Learning Thermostat, the Program is "learned" based on the user's manual inputs over a period of days, which establishes a "normal behaviour" which the Program uses to automatically determine a more tailored and efficient timetable. In practice however, humans do not operate according to rigid schedules. Thus, Programs manually set by users will typically follow one of a "conservative", "best guess," or "liberal" policy. A conservative policy compromises comfort, a liberal one wastes energy, while a best guess estimate may fall somewhere in between. An automatically "learned" Program typically follows a conservative policy, since energy saving is a primary selling point of such thermostats. It can be seen therefore that thermostat Programs always have some level of compromise, which may be acceptable in a domestic environment, but may not be as acceptable in commercial and industrial environments, particularly when activity is far less predictable and the consequences of a sub-optimal Program are much more consequential in terms of energy costs and customer/employee comfort. Even in offices with regular working hours, employees may sometimes work late, or on weekends, and still want to maintain a comfortable environment. To provide for this, users need to be able to override the Program; but if the user is given full programming privileges via a password or PIN, this could result in the Program being left in the overridden state. Accordingly, it may be preferable for the Program to only allow unauthorized changes to be effective for a limited time period.

More recently, manufacturers of Smart Thermostats have begun to include support for "Demand Response" or "DR" initiatives, for example by supporting the OpenADR standard, whereby a signal, typically initiated by the power generating utility, is sent to Smart Thermostats in periods of high demand (DR event). Upon receiving the signal, the Smart Thermostat either forcibly changes the Set Point temperature (typically by a few degrees), thereby lowering demand, or inhibits heating or cooling completely for a specified period of time. In return for participating in the DR program, the consumer typically enjoys a lower pricing tariff, or receives monetary incentives for participation.

Where Smart Thermostats are deployed on a large scale, this can be a very effective method of reducing overall demand, but at the expense of comfort. DR programs typically allow a consumer to manually "opt out" via a button on the Smart Thermostat each time a DR event occurs; otherwise the entire heating/cooling system typically stops consuming energy until such time as the changed Set Point is reached, or until the DR event ends. Alternatively, a DR event may cause the Smart Thermostat to operate on a restricted duty cycle, for example a maximum of fifteen minutes on, followed by fifteen minutes off. For commercial and industrial consumers, DR programs typically require the consumer to reduce consumption by either an absolute amount or by a percentage of their current load, and to do so for specified increments of time (typically one hour). Thus, the commercial or industrial consumer has a degree of choice over which loads are reduced in a DR event, but nevertheless must ensure that the reduction actually takes place for the required duration and, in the case of an unanticipated or emergency DR event, within the required time period (typically fifteen minutes). Power generating utilities typically check for compliance to a DR notification using the utility meter installed in the building. It is now common for power generating utilities (and others) to give advance warnings of anticipated DR events, such as when extreme weather is forecast. These warnings typically occur hours, or even days, before a DR event actually occurs.

In addition to standard consumption charges (typically measured in kilowatt hours), commercial and industrial organizations generally pay an additional "Demand" charge, which reflects the highest level of power drawn (typically the highest average kilowatts of power drawn for any fifteen or thirty minute period during a billing cycle). These Demand charges, which can be very substantial, are not commonly applied to residential power consumers. However, residential consumption charges are often tiered, such that the price rises as given consumption levels are reached. U.S. Pat. Nos. 7,580,775, 7,894,946, 8,527,108, 8,527,209, and 8,918,223 all to Kulyk, et al. describe means to reduce consumer peak demand by scheduling the operation of loads having duty cycles, such as heating and/or cooling equipment, using dedicated independent controllers that manage traditional thermostat operation to achieve a more constant power demand. Such peak demand levelling is commonly referred to as "Demand Management."

Temperature controlled environments are typically divided into independently controlled areas or "Zones". A small residential apartment will typically have only one Zone, while in larger homes each principal room might have its own Zone. Each such Zone typically has its own thermostat controlling the heating or cooling in that Zone. In residential environments it would be very unusual for a given room to have more than one Zone. In contrast, commercial and industrial environments frequently have multiple Zones in a single (usually large) physical area. Consider, for example, a restaurant that is effectively one large contiguous dining space. In this example, multiple independently controlled Zones may be employed so that, for example, an area having a high heat gain such as near sunny windows, can be controlled independently from an area having a lower heat gain, such as at the rear of the restaurant. If only a single thermostat were installed for whole dining area, in sunny weather either the window area would become too hot, or the rear area would become too cool. With multiple Zones, individual Smart Thermostats would be required in order to provide adequate temperature control for the comfort of patrons and employees. As used herein, a physical area having multiple Zones will be denoted a "Locale."

In view of the above described circumstances, there exists a need to more effectively manage and orchestrate the operation of Smart Thermostats according to a wide variety of constantly evolving circumstances and requirements. Accordingly, it is an object of the invention as described herein to overcome the shortcomings and limitations described above by providing means for remotely orchestrating the operation of multiple Smart Thermostats, regardless of their location, type, model, or manufacturer. It is a further object of the invention to provide a Cloud Orchestration Platform ("COP") that provides a common user interface configured to provide convenient remote user access to, and the management and orchestration of, multiple and diverse Smart Thermostats. It is yet a further object of the invention described herein to provide devices and systems for implementing the COP. It is also an object of the invention to provide means, methods, devices, and systems that provide the functionality to wirelessly connect to and manage multiple and diverse Smart Thermostats to achieve significantly enhanced functionality, ease of use, and energy cost savings. It is further an object of the invention to provide a Cloud based platform that utilizes network resources directed to monitoring and controlling smart thermostats through the management of public, private, and hybrid Cloud environments. It is a further object of the invention to orchestrate the operation of individual energy consuming loads within of a group of loads so as not to exceed self-imposed or energy grid mandated limitations. The type of loads orchestrated include, but are not limited to air conditioning and refrigeration compressors, HVAC ventilation fans including variable air volume and constant air volume types, and such other loads as may be controlled by Smart Thermostats, or their equivalent.

These and other objects of the inventions set forth below are described in sufficient detail to allow a person having ordinary skill in the related arts to make and use the inventions. For a more complete understanding of the nature and advantages of embodiments of the present invention, reference should be made to the ensuing detailed description and accompanying drawings. Other aspects, objects, and advantages of the invention will be apparent from the drawings and detailed description that follows. However, the scope of the invention is defined by the recitations of the claims.

BRIEF SUMMARY OF THE INVENTION

According to a first aspect of the invention, a Cloud Orchestration Platform ("COP") connects (directly or indirectly) to each Smart Thermostat to receive status and settings information from it, and to send commands to the Smart Thermostat to change its settings. Such a COP may be configured to connect with a single model of Smart Thermostat, more preferably with multiple models of Smart Thermostats from a single manufacturer, or most preferably with different models of Smart Thermostats from different manufacturers.

According to a second aspect of the invention, a set of individual Smart Thermostats in the Zones of one or more Locales having similar requirements is managed together as a "Group" by the COP. For example, the Smart Thermostats for one or more physical areas of the building are managed together as a Group. Such management, for example, establishes a single master Program that is automatically applied by the COP to all Smart Thermostats in the Group. Additionally, a change made to the Program on a given Smart Thermostat can be automatically replicated to other Smart Thermostats in the Group by the COP, thus avoiding the need for the user to individually adjust multiple Smart Thermostats. Such functionality significantly reduces the time needed to program or reprogram multiple Smart Thermostats while also reducing the likelihood of introducing programming errors.

An additional function of Group management allows the Program of Group member Smart Thermostats to be periodically reset to the master Program by the COP; for example, resetting daily at midnight, thereby restoring a Program that may have been altered by a user. This provides user comfort while ensuring that the Program change is temporary.

According to a third aspect of the invention, the individual Smart Thermostats in a given Group do not run their own individual Programs, but are controlled according to a master Program, which is automatically sent to each Smart Thermostat at the appropriate time a change is required. Such a master Program can incorporate the individual characteristics of each Zone or Locale, such that for example, different Set Points may be applied for different areas, Zones, or Locales of the building.

According to a fourth aspect of the invention, a change in Program for a given Group, Locale or Zone (whether the Program is maintained locally in the Smart Thermostat, or in the COP) is triggered by an external stimulus, indicating that a Zone or Locale has become occupied, or is no longer occupied, such that the Program can automatically be appropriately adjusted. For example, arming an intruder alarm system would indicate that the area it protects is no longer occupied.

According to a fifth aspect of the invention, the COP receives DR event signals and reprograms a combination of one or more Smart Thermostats to achieve the required reduction in load. In determining the appropriate combination and reprogramming to apply, the COP considers some or all of: the total current power load of the building (typically measured at a utility meter), historical power use data, the size of load connected to each Smart Thermostat, the current Set Point, whether the Set Point has been reached and if so how long ago, the current temperature, the rate the temperature is changing, the length of time the load has been active, the time when the DR event will come into effect, and the anticipated duration of the DR event.

In an exemplary scenario where the start time (or anticipated start time) of the DR event is known sufficiently in advance, the COP can adjust the Smart Thermostats such that the Set Point of each will be achieved immediately prior to the DR event start time; alternatively, the COP adjusts the Set Points such that the Zones are over-cooled ("Pre-Cooling") or over-heated ("Pre-Heated") immediately prior to the DR event start time, so that acceptable comfort levels are extended through most or all of a DR event without the necessity to activate the heating or cooling equipment.

Means can also be provided for the consumer to pre-determine Zones Locales or Groups that should always be included, or always excluded, from DR events, or to otherwise establish priorities such that, for example, comfort in customer occupied Locales is prioritized.

A sixth aspect of the invention provides Demand Management, whereby the COP continuously controls the Smart Thermostat to reduce the cumulative demand of those Smart Thermostats that simultaneously have active heating or cooling loads. For example, the Set Point of a Smart Thermostat is temporarily raised or lowered, or its associated load is disabled, to prevent the load becoming active until another Smart Thermostat has reached its Set Point, whereupon its load then becomes inactive. In determining which Smart Thermostat is to wait, the COP considers some or all of the following: the total current load of the building (typically measured at a utility meter), historical power use data, the size of load connected to each Smart Thermostat, the current Set Point, whether the Set Point has been reached and if so how long ago, the current temperature, the rate the temperature is changing, and the length of time the load has been active.

Such Demand Management can also be provided during DR events, such that the load reduction requirements continue to be met, but the permitted load is sequenced across Smart Thermostats such that comfort levels are maximized while also minimizing demand peaks (load levelling). As with DR, means are also provided with Demand Management for the consumer to pre-determine Zones, Locales, or Groups that should be always included, or always excluded, or to otherwise establish priorities such that, for example, comfort in customer occupied Locales is prioritized.

A seventh aspect of the invention considers the actions of users, limits them as necessary, and provides feedback for other aspects of the invention. If a user adjusts the current Set Point of a thermostat, it can be reasonably deduced there is user discomfort. Accordingly, the COP monitors the Set Point of each Smart Thermostat, detects changes, and considers them in making Demand Management and DR decisions. For example, consider a scenario where, on a hot day, a DR event is called and the Smart Thermostat Set Point is automatically raised by the COP. If the resultant rise in temperature causes discomfort, a user may manually lower the Set Point on the thermostat. As previously described, users sometimes over-compensate by changing the Set Point by a greater amount than is necessary in terms of achieving the desired comfort level. Just the fact that the user has lowered the Set Point at all can be used by the COP as an indication to give a higher priority to that particular Smart Thermostat and, optionally, others in its Locale or similarly situated, during the DR event. After the DR event, the Set Point can then optionally be returned to a value appropriate for the changed circumstances.

In eighth aspect of the invention, premises, Locales, or Zones can be pre-cooled (or preheated) in anticipation of a demand response ("DR") event in order to reduce energy consumption during the DR event.

In a ninth aspect of the invention, the power demands of a plurality of loads are orchestrated so as to not exceed a maximum demand ("MD") for the combined group.

In a tenth aspect of the invention, following a DR event, a plurality of loads is orchestrated so as to reduce the so-called "spike" that typically occurs when the loads are no longer restricted in their operation.

In an eleventh aspect of the invention, loads in a group of loads are prioritized according to their urgency or "Need" to run and enabled or disabled according to a schedule with a goal of not exceeding a target MD load level for the group.

In a twelfth aspect of the invention, Smart Thermostat calls for cooling (or heating) are communicated to a COP, which determines if the associated loads should be enabled or not enabled according to whether a load threshold would be exceeded.

In a thirteenth aspect of the invention, systems and methods for orchestrating distributed energy resources ("DER") and energy storage capacity that are incorporated together with energy consuming loads are described.

BRIEF DESCRIPTION OF THE DRAWINGS

In the accompanying drawings.

FIG. 3 shows four exemplary tables maintained by the COP, detailing the available Cloud based services, monitored Smart Thermostats, an example master Program, and Smart Thermostat readings.

FIG. 7 shows two exemplary tables of Smart Thermostats priority ranked by the COP.

FIG. 8 shows three exemplary tables of Smart Thermostat information maintained by the COP, including rates of temperature change information in Table 7, current billing period Maximum Demand information in Table 8, and information regarding to the Smart Thermostats under consideration for advancing under Demand Management in Table 9.

FIG. 10 shows exemplary graphs indicating power and temperature during unmanaged, and fully managed, DR events.

DETAILED DESCRIPTION AND BEST MODES OF IMPLEMENTATION

Figure 1:
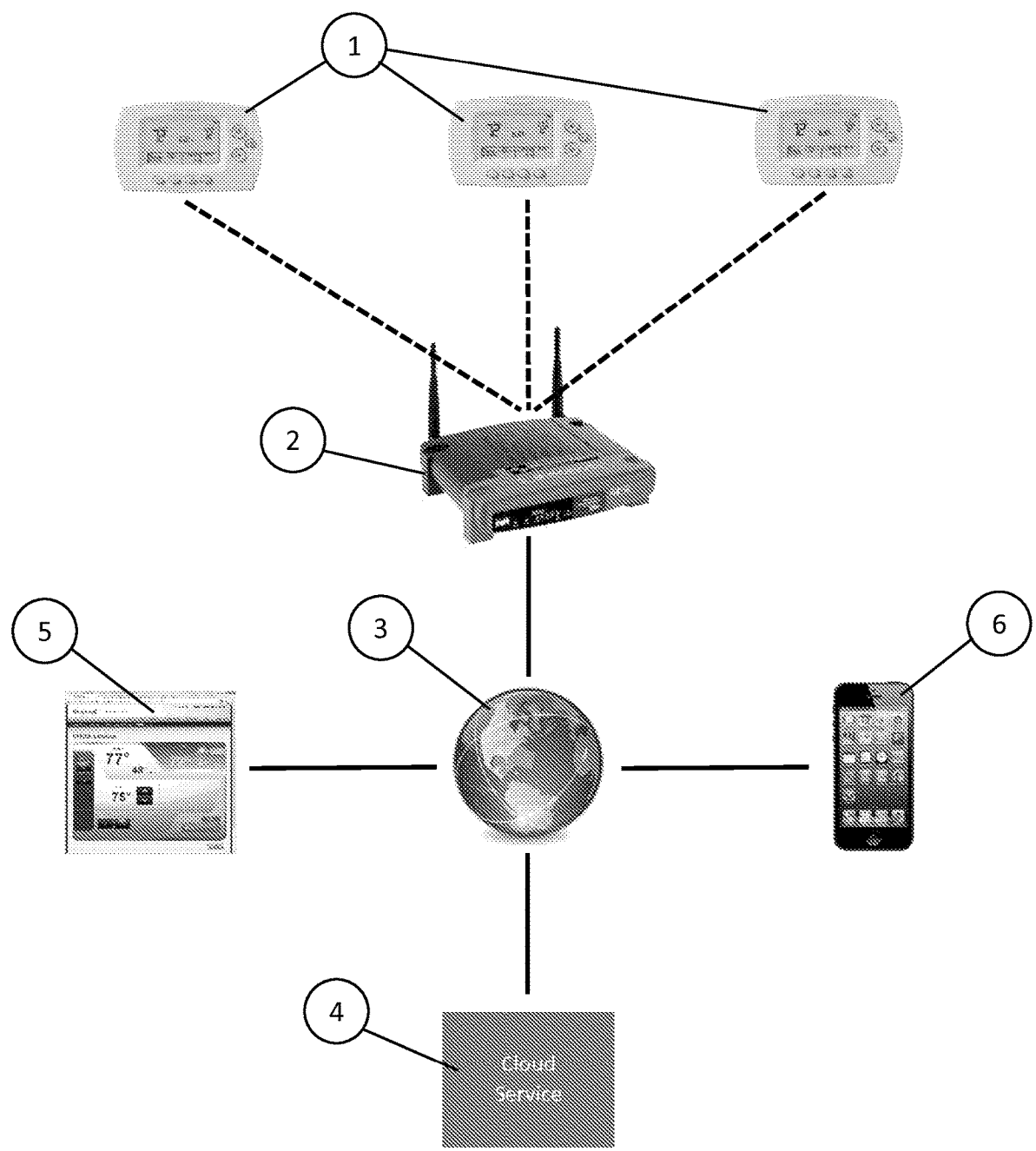
FIG. 1 shows an arrangement of Smart Thermostats, connected via Wi-Fi to a Cloud based service, which allows them to be monitored and controlled via the Internet by a Web browser or smartphone application according to one exemplary aspect of the invention.

A detailed description of one or more embodiments of the invention is provided below along with accompanying figures that illustrate the principles of the invention. The invention is described in connection with such embodiments, but the invention is not limited to any such particular embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the broadest reasonable interpretation of the claims, which does not necessarily include some or all of these specific details, but may include equivalents thereto either known or unknown at the present time. For the purpose of brevity, technical issues generally known to persons having ordinary skill in the relevant technical fields related to the invention have not been described in detail so as to more succinctly define the invention per se.

Algorithms and programs associated with the implementing the methods described herein are not inherently related to any particular computer or other apparatus operative in controller. Various general-purpose computing systems and devices may be used with programs in accordance with the teachings herein, or it may prove convenient to construct more specialized apparatuses to perform the required machine-implemented method operations. The required structure for a variety of these systems will be obvious from the descriptions provided below to persons having ordinary skill in the relevant arts. Exemplary embodiments of the present invention are not described with reference to any particular programming language, as it should be appreciated that a variety of programming languages may be used to implement the teachings of embodiments of the invention as described herein.

The term "demand" is a term of art in the electric utility business that indicates the rate at which energy is being supplied to, or consumed by, one or more electrical loads. The measure of demand is energy per unit time and is usually expressed as kilowatts or "kW." Electric utilities must scale their infrastructure, including generation and distribution facilities, to meet expected peak demand. Thus, there is a strong incentive to reduce peak demand so as to minimize infrastructure costs. Thus, utilities typically apply steep pricing tariffs that penalize high demand in an effort to minimize peak demand. As used herein, the term "demand" should be understood to refer generally to the electric power drawn by the load or loads associated with a Smart Thermostat. In the context of utility bill pricing, the demand delivered to a consumer over a specified time period, typically fifteen or thirty minutes, is used by the utility to determine the demand tariff to be applied. The demand tariff is normally keyed to the maximum demand observed for any such time period during a billing cycle. This demand value is known variously in the industry as the "maximum sustained demand," "maximum integrated demand," or simply "maximum demand." As used herein, the phrase "Maximum Demand" or "MD" will be used to particularly indicate the value used by a utility, usually given in kilowatts, to determine demand charges for a billing cycle. Elsewhere, the phrase "peak demand" should be taken to indicate more generally a temporally high rate of energy consumption. Generally, the term "demand" should be understood to apply to a single load or multiple loads controlled by a single Smart Thermostat, or to the aggregated demand of the loads controlled by a plurality of Smart Thermostats.

Closely related, and sometimes used interchangeably with the term "demand," is the term "load." In one of its meanings, the term "load" also indicates, as does demand, a rate at which energy is used by an energy consuming device or appliance (e.g., compressor or blower in the case of HVAC), or by a group of such devices or appliances. The term "load" can also be used to refer to the energy consuming device or appliance per se. As used herein, the term "load" refers generally to either to an unspecified power level, or the device that is drawing that power. In certain contexts herein, where the term refers to a particular power level drawn by a particular device while it is running, the term "Load" will be used; the particular power level specified may be either a measured power level or an estimated power level. Supplemental sources of electrical energy such as photovoltaic solar cells, windmills, turbine generators, and other such electrical power sources, known collectively as "distributed energy resources" or "DERs." DERs can be treated in a similar manner to energy consuming loads; e.g., as nodes in an energy network with associated "loads" that reflects the energy producing capacities of the DER. DERs often include energy storage capabilities, typically batteries, although other technologies such as inertial energy storage are sometimes employed. Energy storage allows energy to be saved during periods of high DERs output for use at times of higher need, such as at peak demand periods to reduce costs and/or meet DR target loads.

Embodiments of the invention can be implemented as methods, or as machine readable non-transitory storage media that stores executable instructions that, when executed by a data processing system, causes the system to perform the method. An apparatus, such as a data processing system configured to carry out the claimed invention, can also be an embodiment of the invention. Other features of the present invention will be apparent from the accompanying drawings and from the detailed description that follows.

Presented in FIG. 1 is an exemplary configuration according to the prior art. Included therein is a network of devices comprising a set of one or more Smart Thermostats (1), in this case a single model from the same manufacturer, that are connected to a Wireless Access Point (2) which provides access to the Internet (3). The Smart Thermostats communicate with a Cloud based service (4), which is provided by the Smart Thermostats' manufacturer, or their agent. The Internet address or "URL" of the Cloud based service is pre-programmed into each Smart Thermostat, such that, upon installation, the Smart Thermostat is able to connect and register with it.

A user typically establishes an account with the Cloud based service using a Web browser (5) on their Internet connected smartphone, laptop, or similar device (6). The address of the Cloud based service for establishing the account is usually provided in the Smart Thermostat documentation.

Each Smart Thermostat has a unique identifier that is stored internally in its non-volatile memory, and is also typically printed on a label on the back of the device, or otherwise included in its packaging. The user typically associates all the Smart Thermostats in their installation with their Cloud service account by entering the unique identifier for each device. The user can thereby monitor and control all their Smart Thermostats from a single account.

Communication between the user and each Smart Thermostat typically transpires only via the Cloud based service, and not directly. The Cloud based service and each Smart Thermostat periodically communicate such that the Smart Thermostat can update the Cloud based service as to its current status, including for example the current ambient temperature and Set Point. The Cloud based service can send the Smart Thermostat, at its discretion for example, new operational settings, weather information, software updates, and so on. Such communications can be performed on a fixed time interval, for example once a minute or, more efficiently, only when there is a change in status, for example when the ambient room temperature changes sufficiently to cause the Smart Thermostat to send a message to the Cloud based service notifying it accordingly. Sending messages in response to a change in status is known as "Event Driven" communication, which significantly reduces the overall message traffic the Cloud based service has to process, especially when servicing a large base of Smart Thermostats and many different user accounts.

Users can remotely manage one or more of their registered Smart Thermostat by logging in to their account with the Cloud based service using a Web browser (5) application on their smartphone or other device (6). The Cloud based service typically maintains the current status of each Smart Thermostat, which it can immediately return to the user. Alternatively, the Cloud based service can query the Smart Thermostat to determine its current status. This is sometimes done if the Smart Thermostat has not recently sent updates to the Cloud based service.

Remote setting changes requested by the user using the Web browser or smartphone are relayed by the Cloud based service to the Smart Thermostat. Such changes are typically queued, and may not be sent to the Smart Thermostat immediately, especially if the Cloud based service has a high workload, such as when a DR event is called when the Cloud based service might be required to change the Set Points of hundreds or even thousands of Smart Thermostats across many user accounts.

A manufacturer's Cloud based service typically provides an Application Programming Interface ("API"), which allows third party devices and services to monitor and control the Smart Thermostats associated with one or more users. Such APIs may, or may not, provide the same services as those available to the smartphone or other device (6) through a Web browser (5). Monitoring and control capabilities provided through the API are typically the same as are available to the user through their Web browser or smartphone, but may be a subset or superset of them.

The COP of the present invention achieves intelligent control of Smart Thermostats by collecting and analyzing various types of data. These data include thermostat temperature Set Points, ambient temperature, load power, location, DR parameters (time, pricing), maximum load pricing, and any other direct or related load data as required by the systems and methods described herein. These data may be obtained directly from the Smart Thermostats, utility, equipment manufacturers, or any suitable source and may be real time, quasi-real time, historic, or estimated values. Collectively, these data shall be identified generally herein as "load state data."

Figure 2:
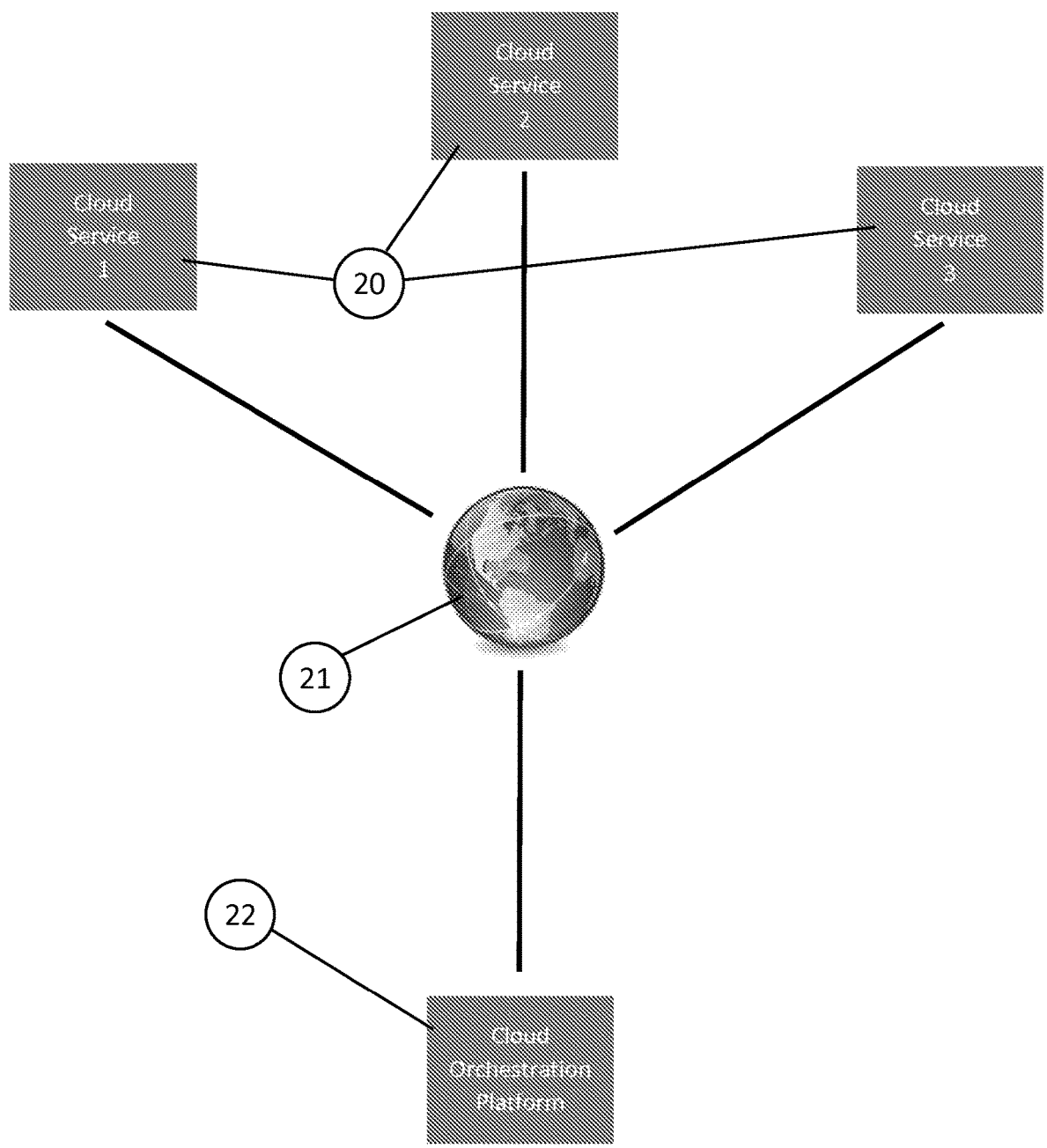
FIG. 2 shows a COP connected to three different Cloud based services via the Internet according to one aspect of the invention.

According to the first aspect of the invention, in FIG. 2, COP (22) communicates with the APIs of one or more Cloud based services (20) via the Internet (21). Each Cloud based service will typically be provided by the respective Smart Thermostat manufacturer (or an agent acting on their behalf). Each API will typically use a different command syntax and often a different messaging protocol. The COP must therefore know the correct syntax and protocol for each manufacturer's API it supports.

FIG. 3 presents exemplary Table 1 (30), which is maintained by the COP, containing a list of Cloud services that it supports. Each service includes an identifier (S1-S3), a value indicating the command syntax and protocol required for communication ("A" and "B"), and a Uniform Resource Locator ("URL") for the Internet address of the API.

Exemplary Table 2 (31), which is also maintained by the COP, contains a list of Smart Thermostats it has been configured to monitor and control for a given site, —in this exemplary case, a restaurant building. Each Smart Thermostat has an identifier (T1-T5), which corresponds to the name used by the Cloud based service, the Load (e.g., kW) consumed by each load the Smart Thermostat controls, a Group number (G1 & G2), a Locale number (L1-L4), the identifier of the Cloud based service that manages it (S1 or S3), and the access credentials for the corresponding services. Using the information in these tables, the COP is able to manage all the Smart Thermostats in the building, irrespective of manufacturer, or the Cloud based service used to communicate with them.

Load values for the corresponding Smart Thermostats, such as the exemplary values presented in Table 2 (also repeated in Table 7) are not typically available through currently available Smart Thermostats per se, but can be estimated, or could be provided by the user such as by referencing the manufacturer and model numbers of the respective air conditioning and/or heating units. More advantageously, actual Load values would be monitored by the Smart Thermostat directly, or by means of a load sensing device in communication with the Smart Thermostat. Yet more advantageously, means can be provided that would enable the Smart Thermostat to monitor and report to the COP actual measured power levels when the load is actually running (called). For purposes herein, Load data is considered to be either an estimated Load or an actual measured Load. In either case, Load values as used here should be as close as practicable to the actual power that will be drawn by a Load while energized.

Figure 4:
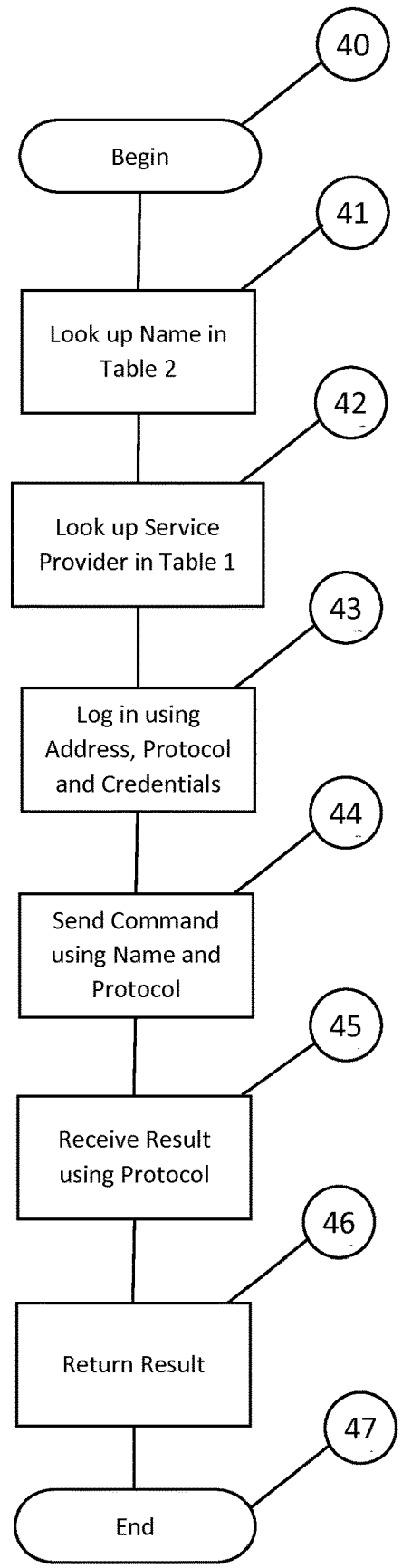
FIG. 4 shows an exemplary flowchart for processing a simple Smart Thermostat command at the COP.

FIG. 4 presents an exemplary flowchart of the process a COP can use to execute a simple command to obtain the current ambient temperature registered at a given Smart Thermostat, in this case the one located in the restaurant Bar. The process begins at step (40). At step (41) the COP looks up the entry for "Bar" in Table 2 (31). This is found at row 2 of the table, where the fields for Service and Credentials are "S1" and "myaccount|mysecret" respectively. At step (42) the COP looks up Service "S1" in Table 1 (30). This is found in the first row, where the fields for Protocol and Address are "A" and "https://apil.abcmfr.com" respectively. At step (43) the COP logs in to the Cloud based service API located at Address "https://apil.abcmfr.com" by supplying the credentials "myaccount|mysecret." Having successfully logged in to the account, at step (44) the COP sends a command using the Protocol "A" syntax that is coded and stored in non-volatile memory associated with the COP to retrieve the ambient temperature of the Smart Thermostat "Bar." Temperature data is received as "72" at step (45), and returned to the requester in step (46), with the process ending at step (47).

The process described for Cloud based service S1 is equally applicable to Cloud based services S2 and S3. Thus, it can be readily seen that by accessing various Cloud based services, the COP can send commands and receive responses independently of the manufacturer or model of the Smart Thermostat, or the particular API protocol used.

The following describes the invention according to a second aspect. In FIG. 3, Table 2 (31) contains Group and Locale information for each Smart Thermostat T1-T5 in the building. In this exemplary embodiment, the Smart Thermostats located in the Entrance Lobby, Bar, Dining Room Window, and Dining Room Rear areas are all assigned to Group G1, because these areas may all be occupied when the restaurant is open and have similar heat loads. The Smart Thermostat in the Private Dining Room is however designated as Group G2 because, for example, it is only occupied at times specifically reserved for a function.

The Entrance Lobby, Bar and Private Dining Room are each designated as a separate Locale, since each is a separate physical room. The Dining Room however has two Smart Thermostats in the same room, so they share the same Locale number L3.

Referring again to FIG. 3, the COP maintains in associated memory a summer (cooling only) master Program for the restaurant in Table 3 (32). The COP continually checks the Time entries against the current time. If the current time matches in any given row, the COP checks the corresponding Days entry to determine if the Time entry applies. For example, the Time entry "11:30 am" in row 1 applies on every day of the week except Monday, on which day the restaurant is closed. The period character in place of "M" (for Monday) indicates that the time entry does not apply on Mondays. On every other day of the week, at 11:30 am the Set Point and Group fields indicate that the COP should issue a command to all Smart Thermostats in Group G1 to change their Set Points to 72 degrees, and thus cool the restaurant ready for the lunchtime service.

The entry in row 2 indicates to the COP that the Set Point should be reset to 85 degrees at 3:00 pm, which corresponds to the end of lunchtime service. A similar pattern repeats in rows 3 and 4 for the evening service, starting at 6 pm and ending at 10 pm.

The entries in rows 5 and 6 apply every day of the week at midnight. Their purpose is to reset the Set Point to 85 degrees so as to ensure that any changes made to one or more of the Smart Thermostats, either locally or remotely through the COP or Cloud based service, are not carried over to the next day. The entry in row 6 applies to Smart Thermostats in Group 2, which in this instance includes only the Private Dining Room. The Program contains only a single time entry for Group 2, reflecting the intention that the Private Dining Room should only be brought to a comfortable occupancy temperature at such time as when the room is actually occupied. In this case, the Smart Thermostat Set Point is manually set (either on the thermostat itself, or using the Web browser or smartphone interface). The entry in row 6 ensures that if the user forgets after an event in the Private Dining Room ends to manually return the Set Point back to 85 degrees, the COP will do so automatically at midnight so as to reduce energy wastage.

Figure 5:
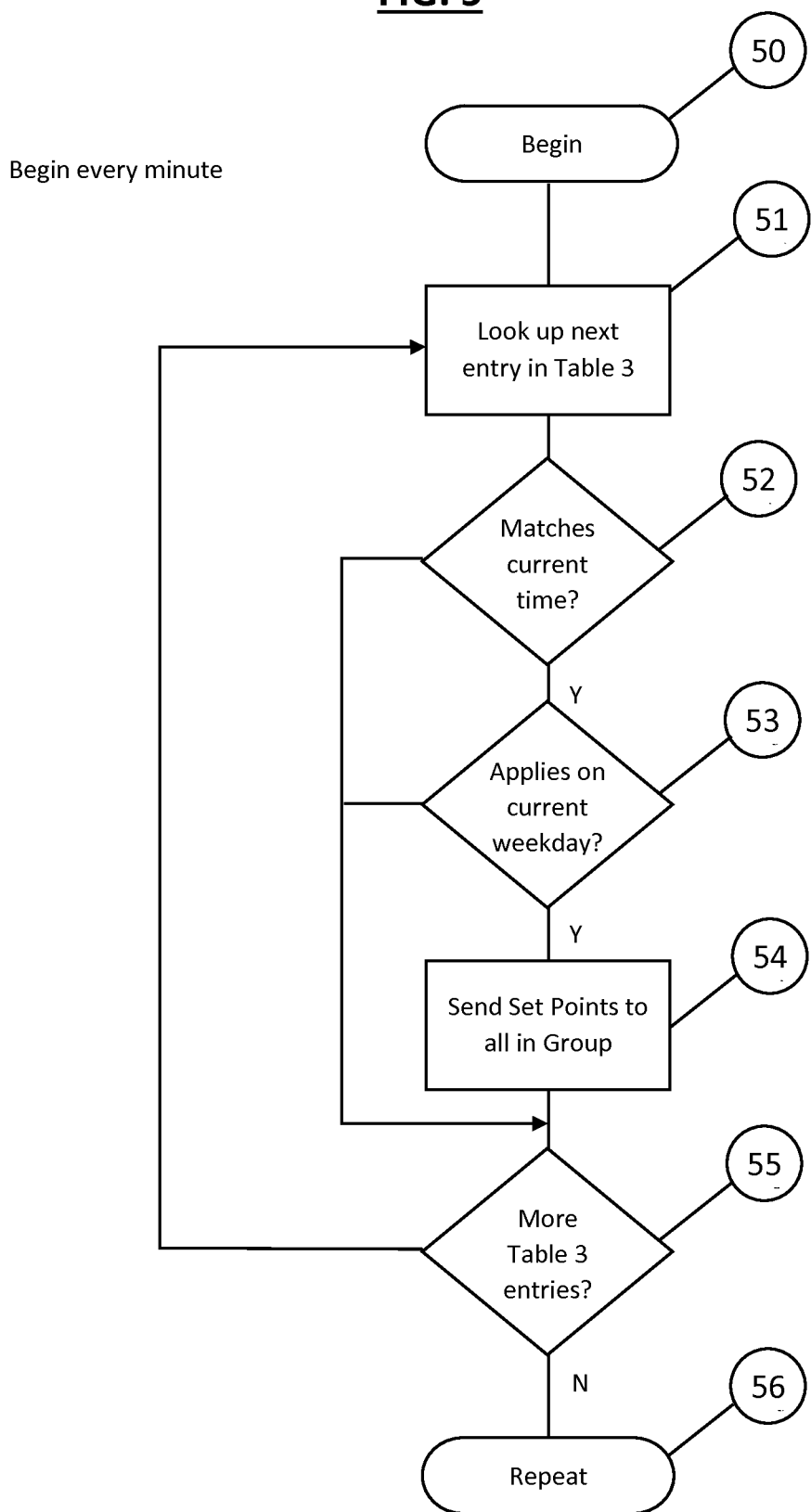
FIG. 5 shows an exemplary flowchart for processing the master Program at the COP and sending resultant commands to Smart Thermostats.

In FIG. 5 there is presented another exemplary flowchart of the process a COP can use to implement the master Program. In this exemplary embodiment the COP initiates a repetitive process (e.g., each minute) starting at step (50). At step (51) the COP considers the first entry in Table 3 (32) and compares the Time field to the current time at step (52). If there is a match, control passes to step (53) and the COP checks if the Days field includes the current day of the week. If the test in either of steps (52) or (53) fails the COP moves to step (55), otherwise in step (54) it sends a command to each Smart Thermostat in the Group designated by the Group field to change the Set Point to the value in the Set Point field. This command is sent using a similar process to that described by FIG. 4, excepting that the command in this example is to change the Set Point; returning Set Point value as in the process of FIG. 4 may or may not be included. At step (55) the COP considers if there are more entries in Table 3 to process and, if yes, proceeds to the next entry back at step (51). Otherwise control passes to step (56) where the process ends.

It shall be appreciated that there are alternative ways in which this aspect of the invention could be implemented. For example, instead of changing the Set Point to a high value, the operating mode of the Smart Thermostat could be set by the COP to "OFF" through controls in the corresponding API, and turned back on when heating or cooling is again required. When turning the Smart Thermostat back on, the Set Point value can also be sent to ensure it has not been manually overridden.

Various aspects of the invention are in response to changes that occur in a Smart Thermostat, or other systems or devices. The COP can become aware of such changes by either polling or event notification methods, both of which are well known in the art. With polling, the COP checks the status of Smart Thermostats on a regular basis, for example every minute, comparing each setting with the value obtained on the previous status check. If the value has changed, the COP then determines whether it needs to act on the change. With event notification, the COP registers with the Cloud service API (or with the API of another system or device) to receive a "callback" when status changes occur. The latter method is considerably more efficient, but can be less reliable. A combination of the two methods can also be used. For purposes of the present invention, status changes for which actions are to be taken by the COP are determined either by polling or by event notification.

Table 4 (33) of FIG. 3 contains the current status for each Smart Thermostat. When a Smart Thermostat status changes, the COP updates the relevant entry in this table. If the change is to the current temperature at the thermostat, then the COP also calculates the rate at which the temperature is changing by comparing the amount by which the current temperature has changed against the elapsed time since the last change was notified. In the preferred embodiment of the invention, the rate of change is stored in degrees per hour, positive if the temperature is rising, negative if it is falling.

Figure 6:
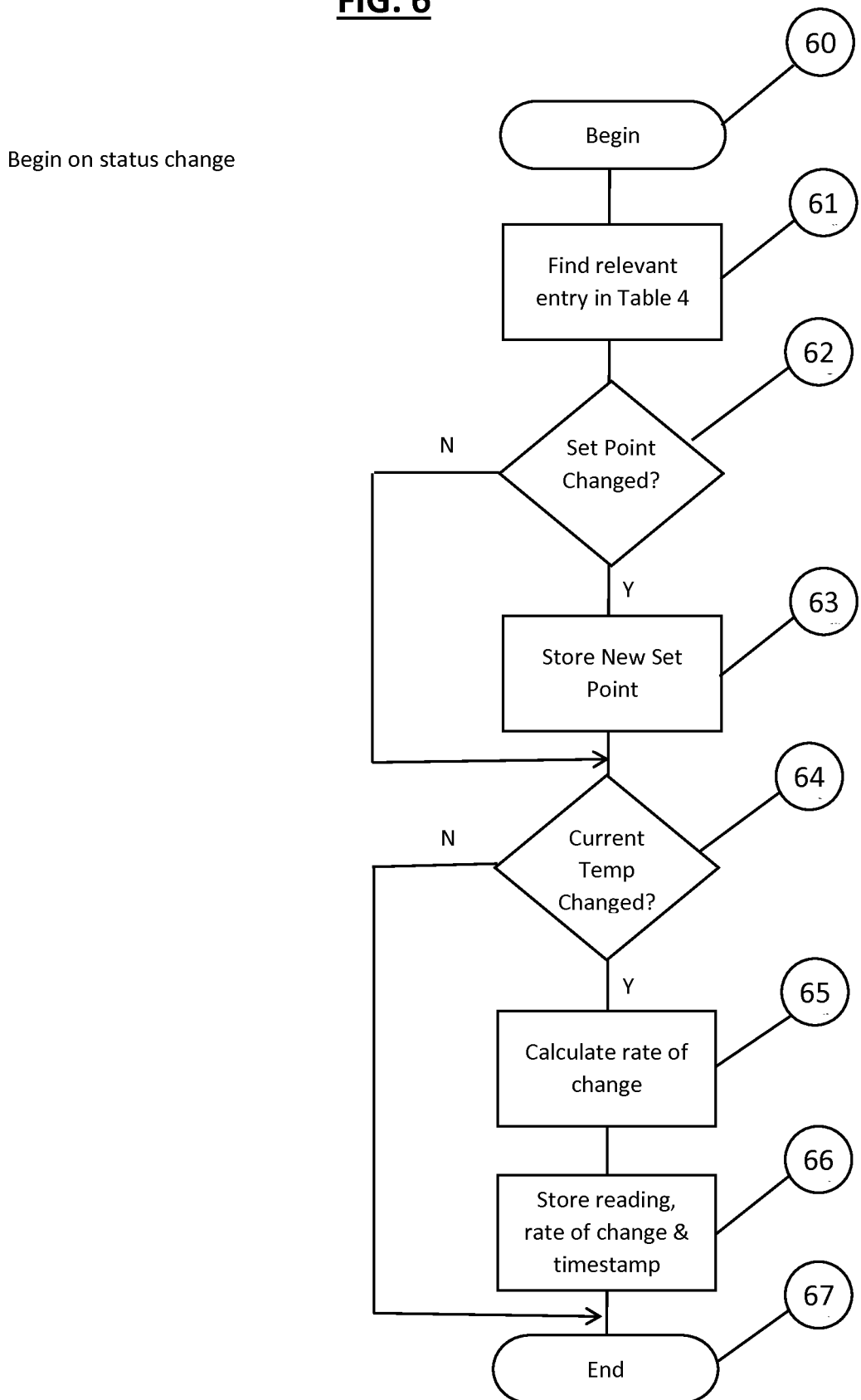
FIG. 6 shows an exemplary flowchart of Smart Thermostat status change processing at the COP.

FIG. 6 presents an exemplary flowchart of the process a COP can use to update Table 4 (33). Upon determining that the status of a Smart Thermostat has changed, the COP begins the process at step (60). At step (61) the COP identifies the entry in Table 4 (33) that corresponds to the Smart Thermostat for which the status change has occurred. At step (62) it determines if there has been a change in the Set Point, and if so, in step (63) the COP updates the Set Point field to the new value; otherwise, it continues at step (64). At step (64) the COP determines the change that has occurred in the temperature by reference to the previous value in the Reading field and at step (65) it calculates the rate of change. The rate of change is the difference between the current temperature and the last value in the Reading field, divided by the time elapsed since the current time and the last Timestamp (in hours). If the temperature is falling, the result will be negative. In step (66) the calculated value is stored in the Rate of Change field, the new current temperature stored in the Reading field, and the current time stored in the Timestamp field. Table 4 (33) also includes a field for the Status of the Smart Thermostat, such as when it is "calling" for heating or cooling, or is disabled (heating and cooling turned off). This field is also updated together with the Set Point, but is omitted in FIG. 6 for clarity.

It shall be appreciated that status and readings from other systems and devices can be obtained and stored in the same way. For example, temperature probes can be installed that are accessible to the COP and used to obtain internal and external temperatures, and have their rates of change similarly calculated and stored. Movement sensors can also be used to determine the amount of time since the last movement was detected, and proximity sensors, contacts in alarm systems, and door locks, singularly or in combination, can be used to determine building occupancy. Simple buttons or switches can also be provided to allow users to indicate the need for heating/cooling as an alternative to providing direct access to Smart Thermostat settings.

According to the second aspect of the invention, a change to the Set Point of a Smart Thermostat is identified by the process described above. If the COP did not initiate such change then it can be deduced that it must have been initiated manually by a user, either on the thermostat itself, or using a Web browser or smartphone interface. By reference to Table 2 (31) the COP can identify all other Smart Thermostats in the same Locale and send commands to change each of their Set Points to the same value using a similar process to that described by FIG. 4, excepting that the command is to change the Set Point; a return current temperature value may or may not be provided. The sending of commands can optionally be delayed for a period of time after the user makes the manual change to ensure that the user has finished making adjustments.

According to the seventh aspect of the invention, a similar process according to the second aspect of the invention described above can be used to limit the changes that users can manually make, particularly if the Smart Thermostat itself or its Cloud based service does not provide the ability to limit such settings. For example, if a status change indicates a Set Point has been moved beyond a predetermined acceptable limit (hot and/or cold), the COP can be configured to issue a command to the Smart Thermostat to set it to that limit. Additionally, the change in Set Point could be permitted to persist for only for a defined period before it is reset to its normal programmed level. Using our restaurant example, this would allow an customer feeing uncomfortably hot or cold to have the temperature adjusted a few degrees up or down, but to have the Set Point returned to its normal value after, say, one hour when that customer is likely to have left the premises.

As previously discussed in regard to premises such as the exemplary restaurant, there is sometimes a need to apply identical Programs to multiple Smart Thermostats that are similarly situated. For example, for multiple Smart Thermostats installed in a common building, Locale, or Zone it may be desirable to have the ability to program two or more Smart Thermostats as a group. Accordingly, in a third aspect of the invention, a plurality of Smart Thermostats can be programmed as a group, thus avoiding the task of programming each Smart Thermostat individually with identical Programs. This aspect can be carried out in a variety of ways. For example, for a plurality of Smart Thermostats residing on a network such as Wi-Fi, ZigBee, Z-Wave, such as might be found in a home, small business, or industrial application, the Smart Thermostats can be configured whereby, when any one of the Smart Thermostats within a particular Zone or Locale is reprogrammed, all of the other Smart Thermostats periodically update their programs to conform to the most recently reprogrammed Smart Thermostat; i.e., reprogrammed according to the most recently reprogrammed thermostat. In a variation of this aspect of the invention, similarly situated Smart Thermostats under the control of a building automation system ("BAS") can be programmed as a group by the BAS. In yet another exemplary variation, wherein the Smart Thermostats are accessible through a (usually proprietary) Cloud based control service (4) such as depicted in FIG. 1, the user can be provided the option of applying the same updated Program to a plurality of Smart Thermostats of their choice. Of course, the user in this scenario could have the option of entering the updated program either locally or remotely by means of a browser (5) or smart phone (6), or automatically by the Cloud service (4) according to a schedule. The schedule could include time of day, day of week, holidays, etc. In a scenario in which Smart Thermostats of different models or manufacturers are installed within a given building, facility, Zone or Locale, a COP can operate through the Smart Thermostats' respective service providers' networks to access and reprogram this heterogeneous group of Smart Thermostats. Consider, for example, a scenario wherein our exemplary restaurant has Smart Thermostats supplied by two different manufactures "A" and "B," each manufacturer's Smart Thermostats residing on a (possibly heterogeneous) network with a topology such as depicted in FIG. 2. In this alternate exemplary scenario, each manufacturer provides access to its Smart Thermostats through their respective proprietary Cloud based services (20). While each of these services may, or may not, provide the capability of programming a plurality of their own Smart Thermostats as a group, they would most likely lack the capacity to program the other manufacturers' Smart Thermostats. In this scenario, a COP can be configured to operate through the respective proprietary networks of manufacturers A and B using APIs to reprogram the heterogeneous Smart Thermostats.

According to the fourth aspect of the invention, Smart Thermostats can be disabled, or the master Program advanced according to external stimuli. For example, the contacts on a main entrance door lock or the setting of an intruder alarm system provide inferred occupancy status information to the COP as described above. In the example restaurant, both would be indicators of the end of service for that the restaurant. When a status change indicates that a given Group or Locale (or multiple of them) are no longer occupied, the COP sequentially scans through the entries in Table 3 (32) until it finds the first entry that would apply after the current date and time. For example, if the current time is 9:30 pm on Tuesday, the entry in row 4 (changing the Set Point for Group 1 Smart Thermostats to 85 degrees at 10:00 pm) is selected to be the first to which this aspect is applied. The COP then immediately acts on this information to either advance the Set Points or disable the Smart Thermostats in Group 1 rather than waiting until 10:00 pm, thereby saving 30 minutes of energy that would otherwise be wasted heating or cooling an empty restaurant.

The external stimulus could also be a simple "end of service" or "restaurant closed" button allowing staff to easily inform the COP accordingly. The COP could then determine the length of time (in hours) for which energy is being saved, by subtracting the current time from the time of the next event entry determined in Table 3 and multiplying by the sum of the corresponding Loads found in Table 2. This saved energy use could then be reported, and the information used for various purposes such as compensating staff accordingly.

According to a fifth aspect of the invention, the COP receives DR event signals, for example via an OpenADR API. Such event signals typically include the time the DR event is due to begin and end. They may also include the amount of load reduction required, either as an absolute amount or as a percentage. The action taken in response to a DR event can be pre-configured at the COP. Special consumption pricing information that applies during the event may also be included and pre-configured at the COP.

In one exemplary scenario, the COP can respond to such events by maintaining its normal operation until shortly before the DR event is scheduled to begin. It then determines the list of active Smart Thermostats currently calling for heating or cooling by reference to the Status field of Table 4 (33), and calculates the current expected total kW load by adding each of the corresponding Load fields in Table 2 (31). In this exemplary case, Smart Thermostats T1, T3 and T4 are in the Cooling On (calling for cooling) state, causing a total load of 35 kW.

Assuming the DR requirement is to reduce load by 20%, which in this case would be by 7 kW, this could be achieved by turning off any one of the three Smart Thermostats T1, T3 or T4 as each is presumably currently consuming 10 kW. To determine which Smart Thermostats to turn off, ranking methods can be devised whereby the COP ranks each one, successively turning off from lowest to highest ranked until it has achieved the required reduction in load.

FIG. 7 presents two possible ranking methods. The first method is based on a simple calculation (70) of how far the Smart Thermostat is from its Set Point, resulting in the ranked Table 5 (71) (some columns omitted for clarity). Working from the lowest ranked Thermostat (T5), neither T5 nor T2 would reduce the load since their cooling load is not presently on, but the required reduction is achieved by turning off T4, which reduces the load by 10 kW. In this example, the Set Point of T4 is only one degree below the current ambient temperature, so the effect of customer comfort level is presumably minimal, compared to the effect of turning off either T3 or T1.

An alternative ranking approach is based on calculation (72) which determines how long it will take for each Smart Thermostat currently cooling (ignoring those not calling for cooling) to reach their respective Set Points, resulting in the ranked Table 6 (73). Again, working from the lowest ranked having the shortest time needed to reach its Set Point, the reduction is achieved by turning off T1, which also reduces the load by 10 kW. It will be appreciated that these and a variety of other factors and methods could be considered in ranking the Smart Thermostats. For example, Smart thermostats could also be prioritized such that the Dining Rooms are given priority over the Entrance Lobby, or other such priorities as determined by the user.

Once the required reduction in demand has been achieved, it must be maintained until the DR event has ended. To achieve this goal, once the Smart Thermostat(s) to be turned off have been determined by the COP, it can either send a command to change the Set Point to the current temperature (or preferably beyond it to ensure the Smart Thermostat will operate on a restricted basis for the duration of the DR event) or to otherwise change the operating state of the Smart Thermostat to inhibit operation, for example turning it to an "OFF" state. Also, to ensure that the Smart Thermostats not currently operating (in this case T2 and T5) remain inactive, the COP can have their Set Points or operating state similarly changed to prevent them turning on.

The COP then waits for one of the Smart Thermostats that has been left operating to reach its Set Point. It then ranks all the Smart Thermostats again, but in this case turns on the highest ranked that will keep the total load within the required maximum, but without exceeding it. A further refinement of the ranking process prioritizes Smart Thermostats with higher loads over smaller loads, for example by delaying activation of two or more smaller loads until after they have reached their Set Points such that a larger load can be run without exceeding the Demand power usage goal. By careful analysis of historical data regarding the time each Smart Thermostat will need to reach its Set Point, a sequence that maximizes comfort (keeping as close to the Set Points as possible) while minimizing aggregate load (ensuring that a maximum power use level is not exceeded) can be achieved. To facilitate this analysis, measuring and maintaining accurate temperature change rates, one pertaining to when each Smart Thermostat is calling for heating or cooling and another pertaining to when it is not, can be advantageously incorporated into an intelligent and effective Smart Thermostat management scheme.

The DR examples above consider only loads controlled by the Smart Thermostats per se, whereas in practice, the DR requirement is typically against the building as a whole. Since the heating/cooling in a commercial building is frequently the most significant proportion of the power load, if the required reduction is an absolute amount, then this can usually be provided entirely by the aggregate of Smart Thermostat controlled loads. If the required power demand reduction is a percentage of the current load, then the total building load can be measured, for example at a utility meter or similar device, and made available to the COP so as to allow it to determine the absolute power reduction required. Alternatively, the required reduction can be estimated based on information such as historical usage data or known power requirements of the non-heating/cooling loads, so that the non-heating/cooling loads will be factored into the required absolute power demand reduction calculated by the COP.

To further minimize discomfort while still meeting peak demand goals during a DR event, Zones or Locales can be Pre-Cooled or Pre-Heated in anticipation of the event. This is particularly important where heavy heating or cooling loads are likely to be required, such as during extreme weather conditions. Consider the restaurant example of FIG. 3. Table 3 (32) presents the COP Program, which indicates changing the cooling Set Points for all Group 1 Smart Thermostats to 85 degrees at 3:00 pm when the lunchtime service ends. At 6:00 pm the same Smart Thermostats will have their Set Points changed to 72 degrees in anticipation of the evening dining service. This will result in a heavy cooling load starting at 6:00 pm because in warm weather all the Smart Thermostats Group G1 are likely to call for cooling.

Periods of high demand, and thus DR events, very frequently occur in the early evening, especially during hot weather, and such an event would therefore be very likely to coincide with the example restaurant's 6:00 pm high load. Consider a DR event issued by an electric utility at 4:00 pm requesting a percentage or absolute power demand reduction for the period 5:00 pm to 7:00 pm. In this scenario, the restaurant cannot reduce its demand at 5:00 pm, because it has no cooling loads to shed, and actually needs to increase its load at 6:00 pm to cool the restaurant in preparation for the evening dinner service. Thus, the restaurant would not only be unable to meet its DR obligation, but also have an uncomfortably hot environment for its patrons unless it significantly increases its electrical demand.

In an eighth aspect, the present invention can address this problem by automatically adjusting the Program for each Smart Thermostat in anticipation of the DR event. According to this aspect of the invention, the COP maintains two separate rates of temperature change, one for when the Smart Thermostat is "calling" and one for when it is not. An exemplary data file containing temperature change rates and associated data is illustrated in FIG. 8 Table 7 (80). The process for obtaining the rate of change data is as described for FIG. 6, except that in this instance while the Smart Thermostat is calling for heat or cooling the Rate of Change Calling field of Table 7 (80) is updated, and while the Smart Thermostat is not calling, the Rate of Change Not Calling field is updated. In Table 7 (80) rates of change are negative when the temperature is dropping and positive when temperature rising, (corresponding in this example to when cooling is active and inactive, respectively).

Figure 9:
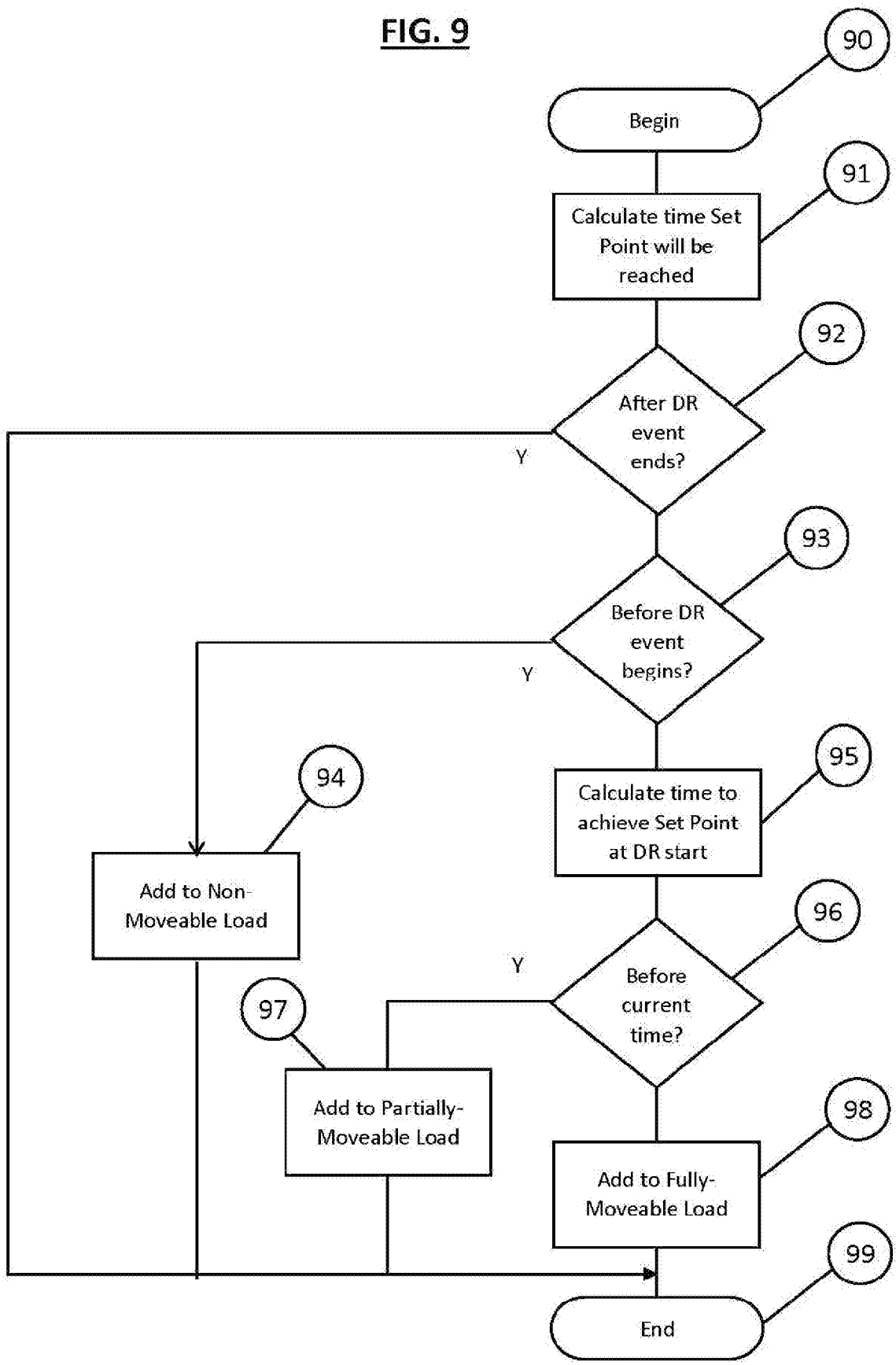
FIG. 9 shows an exemplary flowchart for determining whether the load of a Smart Thermostat is fully, partially, or non-movable for a given DR event.

When a DR event request is received, at 4:00 pm in our example case, the COP considers each Smart Thermostat in turn to determine whether its load is fully, partially, or not moveable in terms of when it is scheduled to be activated or enabled. A flowchart of the process by which the Smart Thermostats determines these three attributes is illustrated in FIG. 9. The process for each Smart Thermostat begins at step (90). At step (91) the COP calculates the time at which the Set Point will be achieved based upon normal operation according to the Group Program. For example, Smart Thermostat T1 with a Reading of 77 degrees at 4:00 pm will have risen 1.8 degrees to 78.8 degrees at 6:00 pm (0.9°/hr×2 hr=1.8°) and will then fall 6.7 degrees, after the Program change initiates cooling at 6:00 pm, to 72.0 degrees at 7:01 pm, at which point the Set Point has been reached and cooling is suspended. At step (92) the COP determines whether or not the time at which the Set Point is reached is after the DR event ends; if so, the process terminates passing to step (99). Otherwise, the process proceeds to step (93)

where the COP determines whether or not the time at which the Set Point is reached is before the DR event begins. If yes, the process proceeds to step (94), and the COP adds the load controlled by the Smart Thermostat (e.g., one of the Smart Thermostats T1-T5 of Table 2 (31)) to a file for non-moveable loads. If no, at step (95) the COP determines the time at which the heating or cooling needs to be turned on in order to achieve the desired Set Point just before the DR event begins. The process then proceeds to step (96) where the COP determines if this time is before the current time; if yes, the process proceeds to step (97) where the COP adds the load controlled by the Smart Thermostat from Table 2 (31) to a file identified as partially-moveable loads. If the time determined at step (96) is at or after the current time, the process proceeds to step (98) where the COP adds the load controlled by the Smart Thermostat from Table 2 (31) to a file identified as fully-moveable loads.

In this exemplary case, Smart Thermostats T1, T2, and T4 all would appear in the fully moveable list as none will reach 85 degrees by 6:00 pm, and all can be started after 4:00 pm and still achieve the 72 degree Set Point by 5:00 pm when the DR event starts. T3 is only partially-moveable, because while it will not reach 85 degrees by 6:00 pm, even if its Program is started immediately, it will only be able to cool to 73.1 degrees by 5 pm.

The COP now causes the Program for each Smart Thermostat in the partially-moveable list (T3 in this example) to advance its cooling cycle to commence immediately, in the example case by changing the Set Point of T3 to 72 degrees. When the calculated start times for each of the fully moveable Smart Thermostats T1, T2, and T4 are reached, the COP similarly causes their respective Programs to advance. In this exemplary case, this happens at 4:15 pm, 4:16 pm and 4:19 pm for each of Smart Thermostats T1, T2 and T4, respectively.

Shortly before the DR event begins in this exemplary case, all fully and partially moveable loads will be running, because their Set Points will not have been reached; however, by the start of the DR event, all fully-moveable loads will have reached their Set Points, thereby reducing the overall load. In the example case, the load will drop at the beginning of the DR event from 45 kW to 15 kW since only Smart Thermostat T3 will be calling for cooling. This more than satisfies the example 20% load reduction requirement.

The COP now manages the remaining loads within the limits required by the DR event as previously described. If the total reduction in load available through reprogramming the fully-moveable loads (together with any reduction that might have opportunistically come from non-moveable loads reaching their Set Point) is not sufficient to meet the demand reduction requirement, then the COP can undertake further actions to reduce the load as described below.

In addition to advancing the Program as described above, it is also possible for the COP to further reduce energy consumption after the DR event begins by preheating or precooling Zones beyond their normal Program Set Points. Because occupant comfort is usually an important consideration, the extent to which this strategy can be carried out depends, at least to some extent, on whether the space in question is occupied. The present invention can avoid undue occupant discomfort by determining occupancy, such as via status events from external devices such as door lock contacts, intruder alarms and other devices as discussed above, or simply according to the current Reading of each Smart Thermostat. That is, if the current Program temperature corresponds to an unoccupied condition (for example, above 76 degrees or below 68 degrees), or heating/cooling is otherwise disabled, it can be reasonably deduced that the Zone in question is unoccupied. In the case of occupied Zones, the COP can moderate its precooling Set Points to be compatible with reasonable occupant comfort. In either case, the COP can advance changes to Set Points to begin acceptable levels of preheating or precooling of Zones in anticipation of a DR event. The time to commence preheating or precooling factors into this calculation the desired time during the DR event for the Zone temperature to return to its normal Program Set Point. In our above restaurant example, the COP could activate all four Smart Thermostats T1, T2, T3 and T4 at 4:00 pm, lowering the Set Points of T1, T2 and T4 further than the previous example so that they cool their respective Zones below 72 degrees (e.g., to 70 degrees) at 5:00 pm, thereby achieving their normal Set Point temperatures by the same time they would have had a DR event not been called.

This process is illustrated in FIG. 10. Graph (100) presents normal operation, with the Smart Thermostats calling for cooling at 6:00 pm, and the required Set Point of 72 degrees being achieved at approximately 7:00 pm. Graph (101) presents exemplary operation with the DR event. At 4:00 pm when notification of the DR Event is received, it is deduced that the building is not occupied since the Set Points are all 85 degrees. The COP determines from the temperature rate of change data of Table 9 (82) that if it cools the Zones to 70 degrees before the DR event begins, the Zones will return to 72 degrees at approximately 7:00 pm as would have occurred under the normal non-DR Program.

Using the above described methods, it can be seen that the requirements of the DR event can be fully met without compromising customer comfort. If however, only very short notice of an upcoming DR event is received, there may not be sufficient time to preheat or precool to minimize the effect on comfort during the event. In such cases there must be some form of compromise. In one embodiment of the invention, a maximum DR temperature variance is configured into the COP. If the COP is unable to achieve the required Set Point by the required time, then it automatically adjusts the Set Point by not more than the maximum DR temperature variance. For example, if the desired Set Point is 72 degrees and the maximum temperature variance for a DR event is determined to be 3 degrees, then the COP adjusts the Program Set Point to a minimum of 69 degrees when heating, and/or a maximum of 75 degrees when cooling. If these minimum or maximum Set Points still cannot be achieved without exceeding the maximum power limit, then the COP simply fails to meet the load reduction requirements of the DR event. While such failure may have economic consequences, in nevertheless ensures that comfort levels required in commercial and industrial environments remain within acceptable levels, thereby avoiding the greater levels of economic loss that would occur from lost business, spoiled goods, and so on.

In order to compensate for the infrastructure costs associated with peak demand, utilities typically use rate structures that include severe penalties for exceeding a nominal "contracted power" level. This penalty is computed by comparing the contracted power level in comparison to actual user demand levels, figured as average power usage over a specified time period, usually 15 or 30 minutes. (For example, an energy consumption of 25 kWh for a specified fifteen minute time period would be 25 kWh÷0.25 hr=100 kW demand level.) Utilities typically use the highest demand level for the billing cycle, or for the year, to determine Maximum Demand or MD, which is used to determine demand charges, which are added on top of energy consumption charges. Demand charges may also be assessed versus a contracted power level. For example, if a customer has a contracted power level of 150 kW and, within a billing period, exhibits a MD of 250 kW, they will be assessed an additional charge based on the 100 kW that exceeded their contracted power level. MD is measured by the user facility's power meter and reported to the utility for billing purposes. Typically, power meters provide "KYZ" taps that output pulses, the rate of which relate to power consumption and the number of which relate to energy consumption. Some newer utility meters also provide a signal that indicates when the demand level is approaching a higher utility tariff threshold such as the contracted power level. Power meters can be monitored locally by devices, including Smart Thermostats, to provide direct determinations of MD. MD data can be supplied to the COP either through a connection to the respective user's power utility, or more likely, by means of a KYZ monitoring device, a KYZ-connected Smart Thermostat, or a combination thereof.

According to the sixth aspect of the invention the COP seeks to minimize the number of Zones operating simultaneously in order to minimize Maximum Demand penalties. Table 8 (81) in FIG. 8 presents the start and end dates of the utility's current billing period configured at the COP. The COP retains the highest MD level reached during the billing period, sustained over a required minimum time period (typically 15-30 minutes), such that it can refer to it when determining whether to permit Zones to operate simultaneously. For example, if a MD of 35 kW is reached during the current billing period, then the COP does not need to restrict load below that value during the remainder of the period (except possibly during a DR event) since doing so will have no effect on the demand charge for that period.

At the very start of a billing period, the MD will be zero. Immediately prior to the start of the billing period, the COP may seek to minimize the demand level, either by adjusting the Set Point of all Smart Thermostats, or by changing their operating mode to off, as previously described. Billing periods typically begin at midnight, so the current load is likely to be at a low level. In a preferred embodiment of the invention, the COP makes a judgment as to the minimum demand likely to be achieved during the billing period based on historical evidence, a configuration setting, or a simple estimation—for example, based on a fraction of all the loads associated with all the Smart Thermostats. If the actual MD load immediately prior to the start of the billing period is below the judged level then no action is taken; otherwise, the Smart Thermostats are adjusted (preferably according to a similar ranking method to that described above) until a target system equilibrium is reached. As used herein, the phrase "target system equilibrium" indicates the desired combined power drawn by a group of Smart Thermostat loads over a specified period of time, typically about fifteen minutes.

In a ninth aspect of the invention, the COP then continuously uses a combination of two methods to limit Maximum Demand. According to the first method, the COP determines the next Program event that will cause a rise in demand by scanning Table 3 (32) as previously discussed for DR. When such a Program event will cause the total load to exceed the MD for the current billing period, the COP determines a subset of Zones for which the Program can be advanced, in a similar manner to that described above for DR, but in this aspect having the goal of not exceeding the current MD. In the event that it is not possible to advance the Program and achieve the required Set Points at the required time without exceeding the current MD, then the MD is increased to a value where such Set Points can just be achieved without exceeding the new MD.

Using the example restaurant, consider an evaluation made at 8:30 am on Tuesday Sep. 2, 2014. It can be seen from FIG. 3, Table 3 (32) that the next occasion on which cooling could be required is at 11:30 am when the Set Point for all Group 1 Zones will be set to 72 degrees. FIG. 8, Table 9 (82) presents the four Group 1 Zones that will exceed the 72 degree Set Point at 11:30 am—in fact they already all exceed it by 8:30 am. This will cause a combined load of 45 kW, which is 10 kW higher than the MD for the current billing period which is reported as 35 kW in Table 8 (81). It can be seen that advancing any one of T1, T2 or T4, each of which has a 10 kW load, such that the 72 degree Set Point is reached just prior to 11:30 am, will limit the total load to the 35 kW MD level. Preferably, the Smart Thermostat selected to be advanced is the Zone that has the slowest rate of change when not calling for heating or cooling, in this case T4, such that the Zones selected to be advanced are those having the longest period of time before the selected zones again call for heating/cooling.

According to the second method for limiting Maximum Demand, and independently of the first method, each time the Set Point for a given Zone is achieved, and therefore the total current load reduced, the COP determines which other Zone (or Zones) should be permitted to operate by ranking the Zones not currently operating in a manner similar to the processes described for determining the rankings presented in Table 5 and Table 6 of FIG. 7, such that those Zones with the highest current imbalance are allowed to operate first. Continuing the above example, Zone T4 will achieve its Set Point just prior to 11:30 am. At that time, no other Zones will be calling since it is not quite 11:30 am, so no further action is necessary. At 11:30 am, T1, T2 and T3 will all call for cooling, causing a combined load of 35 kW, which is just equal to the current MD and therefore also not requiring further action.

Depending on the ambient temperatures and rates of change in each Zone, it may be possible utilizing the first and/or second methods described above to keep the load below the previous MD level. If not, then several variations to the first and second methods can be used. The first such variation is to the first method, whereby the Program for more than the minimum number of Zones is advanced. Continuing the above example, 20 kW of load could be advanced rather than the minimum required 10 kW, achieved in this case by advancing T1 in addition to T4. Advancing the Programs of more than the minimum number of Zones further reduces the likelihood of Zones subsequently calling for heat or cooling simultaneously. It is readily evident that the total load of Zones advanced should also not exceed the current MD.

The second such variation is to the second method, whereby a Zone about to call for heating or cooling that would consequently cause the current MD to be exceeded, is inhibited from doing so, either by adjusting the Set Point or disabling the load. This variation causes temperature to rise or fall below the desired Set Point, but preferably by a small enough degree so as to go unnoticed. Preferably, there is a configurable limit on the amount by which the Set Point can be varied in this way. Zones with such adjusted Set Points are prioritized by the second method when the Set Point of other Zone(s) is reached. As soon as the Zone no longer needs to be inhibited in order to meet the MD, the Set Point is returned to its original Program value.

If the above methods, to the extent they are implemented, are still not sufficient to keep the current load at or below the MD, then the MD is increased by the smallest amount possible, and the value in Table 8 (81) updated accordingly. The second method above can also be executed on a fixed time interval, rather than when Zones begin or end calling for heat or cooling.

According to both first and second variations above, the COP would also consider the effect on multiple Zones in the same Locale. For example, it may be beneficial to increase the priority of Zones with a high rate of temperature change when not calling in a given Locale, and to decrease the priority of those with a lower rate of change.

A tenth aspect of the invention is directed to managing the increased demand or "spike" likely to occur at the end of DR event. At that point it is no longer required to curtail consumption; nevertheless, if all Zones call for heat or cooling simultaneously, the current MD will likely be exceeded. To prevent this, the COP applies the second variation described above.

According to a seventh aspect of the invention, the COP considers user actions in the ranking or prioritizing of Zones during DR and Demand Management. If a user has manually changed, or attempted to change a Set Point, such that the Zone would be calling for additional heating or cooling, then the relevant Zone can be given a higher priority, even if the Set Point is reset as previously described.

With both DR and Demand Management, the COP enables the user to configure Zones, Locales, or Groups that should be always included, or always excluded, from Demand Management and/or DR, or to otherwise establish priorities such that, for example, comfort in customer occupied Locales or preferred Zones is prioritized.

Rates of Change, for example as stored in Tables 7 (80) and 9 (82), can be expanded to provide average rates of temperature change at particular times of day. For example, in calculating the time when a given Smart Thermostat will reach its Set Point, the COP can consider not only the current rates, but how those rates are likely to change during the day. This is particularly advantageous when the time when the calculation is applied is several hours in advance and the Rate of Change may be different. For example, at 9:00 am when the sun is still rising in the sky, the rate at which Zone temperatures increase without cooling may be significantly lower than they will at 2:00 pm. By using average historical values, a more accurate prediction would be possible.

In an eleventh aspect of the invention, methods and systems may comprise enabling or disabling loads associated with one or more Smart Thermostats based upon historical data generated by the load or loads. The methods may be performed once, may be performed repeatedly in response to a particular event, or repeatedly in accordance with a schedule. A particular event may include a change in status of a Smart Thermostat, or an external signal such as from an event timer. A schedule may comprise a plurality of time segments so that the method is preferably performed at least once during each segment of each period. The desired degree of control over the loads that is sought reflected in the choice of duration of the time segments. By way of non-limiting example, in some embodiments the length of each segment is between about five minutes and about fifteen minutes. In some embodiments, COP monitors the status of the Smart Thermostats under its control on a more frequent basis and performs the method within a time segment any time a change in condition is detected; e.g., calling for cooling or heating or ceasing cooling or heating.

A load enabled state may be one in which the load may or may not be actually operating, or may be a state in which the COP forces the load to operate regardless of whether its associated Smart Thermostat is actually calling. In either case, prior to any particular time segment, the COP can make enablement state decisions for that time segment for a load, or plurality of loads, as to which loads are enabled or energized and which loads are disabled or de-energized so as to achieve a desired result in terms of the total energy or average power drawn by the load or loads during that particular time segment. For example, time segments can be selected for operation and non-operation for a plurality of loads such that the total average power draw during any given segment approaches the average power drawn over a preceding number of time segments or entire period and/or does not exceed a target maximum average power draw value during any segment during the period.

In certain preferred embodiments, the enablement states of loads are determined by the COP at each segment in the period in regard to an enablement "Need" of each of the loads. In very general sense, Need is indicative of the extent to which the desired goal associated with a load has not been met. For example, Need may be related to various metrics such as whether a Smart Thermostat is calling, the time elapsed since the Smart Thermostat commenced calling, how far the ambient room temperature has deviated from a Smart Thermostat's Set Point temperature, how long the temperature has deviated from its Set Point, or to how long it would take the load to return the temperature to its Set Point. The degree to which a load's capacity is utilized while it is enabled can also indicate Need. This particular metric for Need is especially applicable to variable load equipment such as multi-stage HVACs, etc. that are configured to adjust their power level relative to various factors such as ambient temperature. Modern multi-stage loads may employ a variety of schemes such as PID (proportional, integral, differential) or other control strategies for optimizing performance factors such as time to Set Point or minimizing total energy consumption. For these types of variable load equipment, previous operation at relatively high power or total energy use levels may indicate a correspondingly high ongoing Need. Accordingly, any of various metrics associated with energy consumption for determining Need will be referred to hereinafter as a "load enable utilization value" or "LEUV."

In some embodiments, the load enabled utilization value may be related to the amount of time that the load is actually operating while the load is in the load enabled state. In some embodiments, the load enabled utilization value may be related to the amount of energy consumed by the load while the load is in the load enabled state. In some embodiments, the load enabled utilization value may be provided as a ratio of the energy consumed by a load during particular time segment to a maximum possible or previously observed consumed energy. In some embodiments, LEUV indicates the extent to which a load consumes energy during a given time span relative to what the load would have consumed if it had run continuously over the same time span. In some instances, LEUV may be understood to be the total energy actually consumed by a load during a given time segment or segments relative to what the energy consumption would have been if the load were operating at that same average power level during the entire time segment or segments. In other instances, LEUV can be calculated in terms of actual energy consumed during a given time span relative to the energy that would be consumed by a load if the load were operating at its maximum power demand level during that time span. In some instances, LEUV can be calculated in terms of actual energy consumed by a load during a given time span relative to the energy that the load consumed during any preceding time span. In yet other instances, LEUV can be calculated in terms of a load's power demand level during a particular time span relative to the power demand level observed for the load during any preceding time span.

In some embodiments, a LEUV may comprise a ratio of an amount of energy actually consumed by the load during one or more time segments to an amount of energy that would have been consumed by the load if the load were operating continuously during the same time segments. In some embodiments, LEUV may be comprised of a ratio of an amount of energy actually consumed by a load during one or more time segments that the load is in a load enabled state to an amount of energy that would have been consumed by the load if the load were operating continuously at maximum power during that same time segments. In some embodiments, determining a LEUV may comprise measuring the amount of energy consumed by the load while the load is in the load enabled state. In some embodiments, the amount of energy consumed by the load may be measured using a sensor device. In some embodiments the energy sensor device may comprise means for measuring electrical current flow to the load.

The amount of energy consumed by the load while the load is in a load enabled state may, in some embodiments, be expressed as a rate of energy consumption (i.e., energy demand) or as a total amount of energy consumed. A rate of energy consumption may be expressed from one or more measured or estimated values of energy demand, from an average value of energy demand, from a maximum value of energy demand, or from any other suitable indication of rate of energy consumption. A total amount of energy consumed may be expressed as a sum or integral of a suitable expression of rate of energy consumption over time. In some embodiments, the amount of energy that is consumed by the load while the load is in a load enabled state may be expressed as a total amount of energy which is consumed by the load. In some embodiments, the total amount of energy that is consumed by a load while the load is in the load enabled state may be expressed as a sum or integral of actual measured values of energy demand over one or more time segments during which the load is in a load enabled state.

In some embodiments, the invention may comprise assigning an assigned Need value for a load whereby a Need value is indicative of how urgently a load needs to be enabled. An assigned Need value may be adjusted by decreasing the assigned Need value when preceding LEUVs for a load are below a lower limit. In some embodiments, the lower limit may be fixed, while in other embodiments, the lower limit may be adjustable. The assigned Need value for a load may be decreased by any suitable amount when preceding LEUVs are below the lower limit. In some embodiments, when preceding LEUVs are below the lower limit, the assigned Need value may be decreased by an amount such that subsequent LEUVs may be expected to be above the lower limit. In some embodiments, upper and lower limits of assigned Need values may be defined so as to effectuate a target range for LEUVs. In some embodiments, an assigned Need values may be decreased or increased by an amount such that subsequent LEUVs can be expected to be at a desired level within a target range.

In some embodiments, when preceding LEUVs are above an upper limit, the assigned Need value may be increased by an amount such that subsequent LEUVs may be expected to be below an upper limit. In some embodiments, when a preceding LEUV is above an upper limit, an assigned LEUV may be increased by an amount such that subsequent LEUVs may be expected to fall within the target range. In some embodiments, the assigned LEUV may be increased by an amount such that subsequent LEUVs may be expected to be at a desired position within the target range. In some embodiments, when a preceding LEUV is above an upper limit, the assigned Need value may be increased by a defined increment. In some embodiments, when a preceding LEUV is below the lower limit, the assigned Need value may be decreased by a defined decrement. The defined increment and/or decrement may be the same or different and may be constant or variable.

In some embodiments, the assigned Need value may be adjusted in accordance with a schedule. In some embodiments, the schedule may be comprised of at least one period, and the period may be comprised of a plurality of segments. In some embodiments, the assigned Need value may be adjusted every period, while in other embodiments the assigned Need value may be adjusted every segment. In some embodiments, a LEUV is compared to upper or lower limits that have occurred during one or more preceding segments. In some embodiments, a LEUV that occurs during a particular time segment is compared to an upper or lower limit that is averaged over two or more preceding segments. In some embodiments, a LEUV that occurs during a particular time segment is compared to upper or lower limits that are a maximum or minimum value, respectively, that has been observed over a number of preceding segments. In some embodiments, a COP can be configured to execute an algorithm comprising assigning a Need value such as to cause a load's LEUV to fall within a desired target range. In some embodiments, the COP can control a load's LEUVs within a target range by enabling or disabling the load during the entire duration of a time segments according to a schedule. In other embodiments, a COP can control a multiple stage load's LEUVs by enabling or disabling one or more stages during part of, or the entire duration of, a time segment. An assigned Need value may be set with the goal of reaching a particular total power consumption objective while still achieving goals such as occupant comfort. In some embodiments, an assigned Need value for each of a plurality of loads is determined with a goal of achieving a combined system load such as target system equilibrium, a target DR load, or a target MD load.

Figure 11:
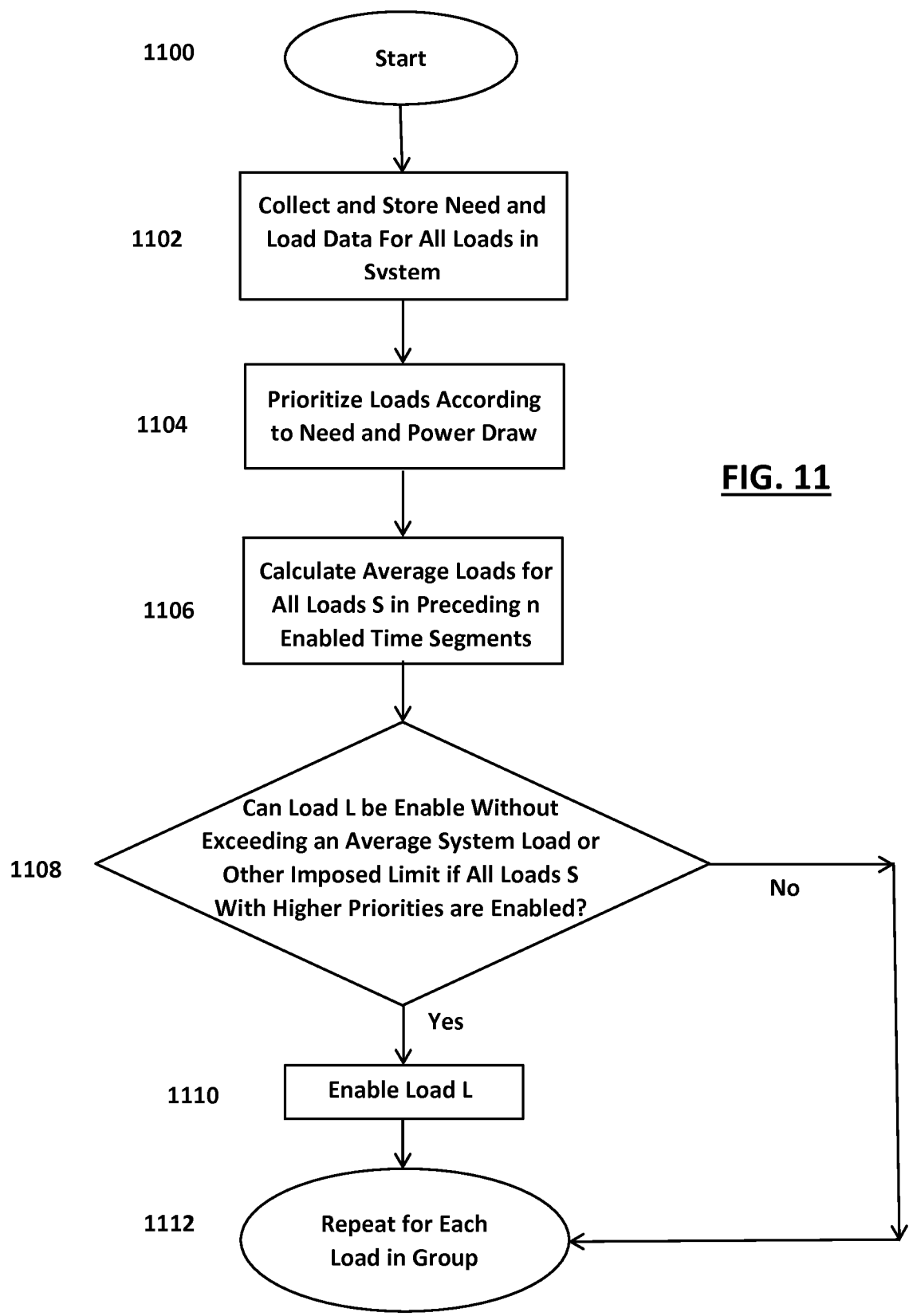
FIG. 11 shows an exemplary flowchart that depicts the steps of a method for enabling a load according to Need.

A method for enabling a load L in a group of loads S according to Need is presented in FIG. 11. The method starts at step 1100 and proceeds to step 1102 where one or more factors related to Need, such as LEUV, number of time segments elapsed since last enablement, Set Point versus ambient temperature, time to achieve Set Point when enabled, etc. and energy consumption data are collected for each load L in a group of loads S. At step 1104, the loads S are prioritized using the Need related data according to a ranking system to arrive at numerical Need values for each load L among the loads S. At step 1106, average load or energy consumption values over n preceding time segments during which the loads were enabled are calculated for each load L among the loads S. Here, n can have any integer value, but is preferably in the range $1<n<10$, and is more preferably in the range $2<n<5$.

At step 1108, an enablement state decision is made for load L, wherein there are two possible enablement states: "enabled" or "disabled." An enabled state is a state in which a load is allowed to operate completely unimpeded except according to its own associated control system, Smart Thermostat, etc. A disabled state is a state in which a load is either prevented from operating at all, or at least prevented from operating at more than a minimum power level; e.g., compressor loads are disabled while still allowing ventilation fans to operate in an HVAC system. At step 1108, an average system load is calculated by combining or summing all the individual loads S, including enabled and disabled loads, over m preceding time segments. This average system load is compared with the average combined load for all loads in the group of loads with a higher priority than load L. Here, m can have any integer value, but is preferably in the range $2<m<20$. If the average load value (energy use or power) of load L while enabled is less than or equal to the difference between the average system load and the load if all loads with higher priorities are enabled, then load L is enabled. Otherwise, load L is disabled and the method repeats for each load L in the group of loads S. By this method, the system load is stabilized such that variations over time are minimized. In some embodiments, a load L may be enabled if it will not exceed the average system by more than a particular incremental amount. The incremental amount could, for example, be in the range of 5% to 20%, depending on the time rate of increase in average system load that is acceptable. If another target system load goal, such as a DR or ML target load, is desired, then such a target system load value is used in lieu of an average system load.

Implementation of Cloud based controls of smart devices has seen rapid development under the umbrella of the Internet of Things or "IoT." While the concept of a network of smart devices was introduced at Carnegie Mellon University as early as 1982 with their development of a modified soft drink dispensing machine, the more recent synergy of several key ubiquitous technologies, including wireless communications, the Internet, smart devices such as Smart Thermostats, wireless LAN's (e.g., Wi-Fi, Z-Wave, and ZigBee), and "Cloud" computing have resulted in the greatly accelerated development of IoT. IoT technologies and services not only simplify the development and deployment of Cloud based data collection and control, but can enable additional enhanced features in regard to Smart Thermostat control as contemplated herein. Of particular relevance to orchestrating the function of Smart Thermostats through a Cloud based COP are Platform-as-a-Service ("PaaS") or Infrastructure-as-a-Service ("IaaS") facilities such as provided via the Cloud by Ayla Networks®, MobiLinc®, etc. Ayla or MobiLinc connected Smart Thermostats could facilitate access to additional data and controls not readily accessible to the user or even to their respective Smart Thermostat Cloud Services. Also, an Ayla or similarly PaaS/Iaas Cloud connected Smart Thermostat can be configured to connect to the COP such that a "call" triggered when hitting a temperature Set Point would be communicated to the COP rather than directly energizing, for example, an air conditioner compressor or other HVAC equipment. In this way, the COP can exercise more complete control over when the cooling load is actually energized. In an eighth embodiment as described below, this added control feature is utilized to further expand the orchestration of Smart Thermostats.

In the above described embodiments of the COP, under typical operation when a Smart Thermostat calls for cooling or heating its associated load (e.g., compressor, furnace, fan, etc.) may or may not actually be energized; i.e., control of when a Smart Thermostat's load is actually energized is merely indirectly controlled by either raising or lowering the temperature Set Point relative to the ambient temperature. Thus, while the load can be reliably maintained in an "OFF" state by disabling the Smart Thermostat, in the enabled state the load cycles according to the Set Point versus ambient temperature. Accordingly, it may be advantageous in certain embodiments for the COP to have more direct control over when a Smart Thermostat's load is actually energized. In these embodiments, the COP can monitor the logical state of a Smart Thermostat, which includes whether and for what it is calling but intercede, for example, by overwriting the Smart Thermostat's state machine bitmask to exercise positive control over whether the associated load is actually running. While recognizing Smart Thermostat calls for heating or cooling, but transferring control of when to actually energize a load to the COP instead of directly to the load, more sophisticated control of when loads are actually energized can be achieved. Various methods for accomplishing positive control of Smart Thermostat loads will be obvious to those having familiarity with networking, programming, and control of Smart Thermostats.

In certain scenarios within the scope of the invention, Smart Thermostats calls for cooling status are communicated by means of a network, or through a plurality of networks, possibly including a proprietary Cloud server, to a Cloud based COP. In a twelfth aspect of the invention, the COP then considers this received information in light of the target system equilibrium (e.g., Demand Management, DR, or MD target system equilibrium) and responds accordingly. Accessing a Smart Thermostat's real time calling status allows the COP to be more responsive to rapid or unexpected changes in temperature than if it relied solely on prior behavior such as a previous LEUV or the expected rate of temperature change. In this example, the Smart Thermostat's "call" state could be communicated via its proprietary server to the COP each time it reaches its current temperature Set Point, or the COP could periodically poll the Smart Thermostat to determine its current status, including whether a Set Point had been reached and whether it was calling. The COP could then examine the current State (33) of each of the other Smart Thermostats in the Group and see if the calling thermostat can be enabled (energized) without exceeding a target system equilibrium. If yes, then the called load is immediately energized; if no, then the COP re-prioritizes the loads according to any of the schemes described herein. The current state data may be the most recently uploaded data, or the COP may request all of the Thermostats to update their status, especially if their status data is older than a minimum length of time, say 2-5 minutes.

In one exemplary embodiment of the twelfth aspect, a Smart Thermostat can be configured such that its energizing signal lines are periodically monitored by the COP. For example, a call for cooling can be recognized by the COP as a voltage on the Y1 line (and possibly the Y2, Y3, etc. lines in the case of a multistage-stage compressor). Similarly, a call for heating can be detected on the W1 line (and possibly the W2, W3, etc. lines for multi-stage heating). The Y lines only control the compressor(s) and the W lines control the furnace or heater, but not the blower(s), which is typically controlled by the G line. In certain embodiments, it may be advantageous for the COP to independently control the ventilation fan(s), either variable air volume of constant air volume types, by activating or deactivating the G line. To enable embodiments where the COP senses the Y, W, and/or G control lines, a Smart Thermostat can be configured whereby the signal lines are interruptible, such as by means of mechanical or solid state relays or the like that are under the control of the COP. Alternatively, either the Smart Thermostat per se or its server/controller can be configured such that the COP can monitor the Smart Thermostat's logic bitmask to determine its control status. In this scenario, upon determining that the Smart Thermostat is calling, the COP could immediately cause the Smart Thermostat's bitmask to be overwritten and returned to a not calling state. In order to maintain this not calling state for a desired period of time, the COP can further cause the Smart Thermostat to extend its updating schedule, thereby preventing it from calling again for desired period.

If a Smart Thermostat having an associated load "L" has been disabled by the COP, but indicates by a signal(s) on the Y or W lines, or by means of its bitmask state, its intention to run, in this eighth exemplary embodiment the COP can determine if any other Smart Thermostats under its control at a client's facility are currently enabled but not actually running. If any such Smart Thermostats "S" are found, they can then be sorted according to their priority relative to load L. Two criteria can be considered in determining priority: the power drawn by the loads S and the expected time they will again call based on their recent activation history. In general, load(s) S with the highest power draw and the longest expected time remaining before calling again (lowest Need) would be selected for disablement. If load L has a power draw greater than a single load S selected according the preceding criteria, multiple loads S can be disabled so as to keep the total power load below a predetermined value; for example, a load value that does not exceed a demand level imposed by Demand Management, DR, or MD considerations. As it is generally not efficient to run an HVAC unit for less than a minimum time, an additional criterion can be imposed such that there must be enough time left in the current time segment to allow load L to run for more than this minimum time.

The following table presents the current status of a group of loads A-E according to one particular embodiment of a twelfth aspect of the invention, wherein loads A-C are enabled but only load A is running, and loads D and E are disabled; but load D, which was previously not calling, is now calling. The power drawn by each of the loads while running is indicated by "load" in the table; the maximum potential combined power if all the loads that are actually enabled and calling (i.e., running) is indicated in the table as "Max Potential Peak," and the combined power of all the loads that are actually running is denoted by "Actual Current Peak."

| Load ID | Need | Load | Enabled | Calling |
|---|---|---|---|---|
| A | 7 | 5 | Y | Y |
| B | 7 | 8 | Y | N |
| C | 6 | 6 | Y | N |
| D | 6 | 7 | N | ~~N~~ Y |
| E | 5 | 9 | N | N |
| Max Potential Peak: | | 5 + 8 + 6 = 19 | | |
| Actual Current Peak: | | 5 | | |

In this example, loads B and C are enabled but not running, making these loads candidates to be disabled in favor of enabling load D, and are prioritized as indicated below.

| Load ID | Need | Load | Enabled | Calling |
|---|---|---|---|---|
| C | 6 | 6 | Y | N |
| B | 7 | 8 | Y | N |

In this case, load C has the lowest Need; i.e., with a Need of 6 load C is less likely to call during subsequent time segments than load B, with a Need of 7. A further constraint may be imposed such that the combined peak power drawn by all of the loads should not exceed a value of 20. In this case, if load C is disabled in favor of load D, the maximum consumed power possible for loads A, B, and D is 5+8+7=20, thus not exceeding this maximum power criterion. If, on the other hand, the combined peak power target is 18, then both load C and load B must be disabled in order to guarantee that the peak power level is not exceeded. Indicated below is the solution for this exemplary case where loads C and B have been disabled and loads A and D enabled, thereby ensuring the combined loads cannot exceed a power level of 12, which is well below a target system equilibrium of 18.

| Load ID | Need | Load | Enabled | Calling |
|---|---|---|---|---|
| A | 7 | 5 | Y | Yes |
| B | 7 | 8 | ~~Y~~ N | N |
| C | 6 | 6 | ~~Y~~ N | N |
| D | 6 | 7 | ~~N~~ Y | Y |
| E | 5 | 9 | N | N |
| Max Potential Peak: | | 5 + 7 = 12 | | |
| Actual Current Peak: | | 12 | | |

HVAC loads with multiple stages can be more advantageously orchestrated if their stages are controlled independently. In some embodiments, even if the associated Smart Thermostat is calling for multiple stages, the COP can select only the first (usually highest power draw stage) to be enabled. In the case of more than two stages, only the first and second stage can be called. Such reduced capacity operation of an HVAC system may be advantageous by allowing a somewhat reduced level of heating or cooling to occur while still not drawing more power than would exceed some designated target power level. Alternatively, additional stages beyond what is being actively called for can be energized in order to hasten heating or cooling in order to achieve a particular temperature level within a shortened time period as, for example, when pre-heating or pre-cooling premises in advance of a DR event, etc.

Figure 12:
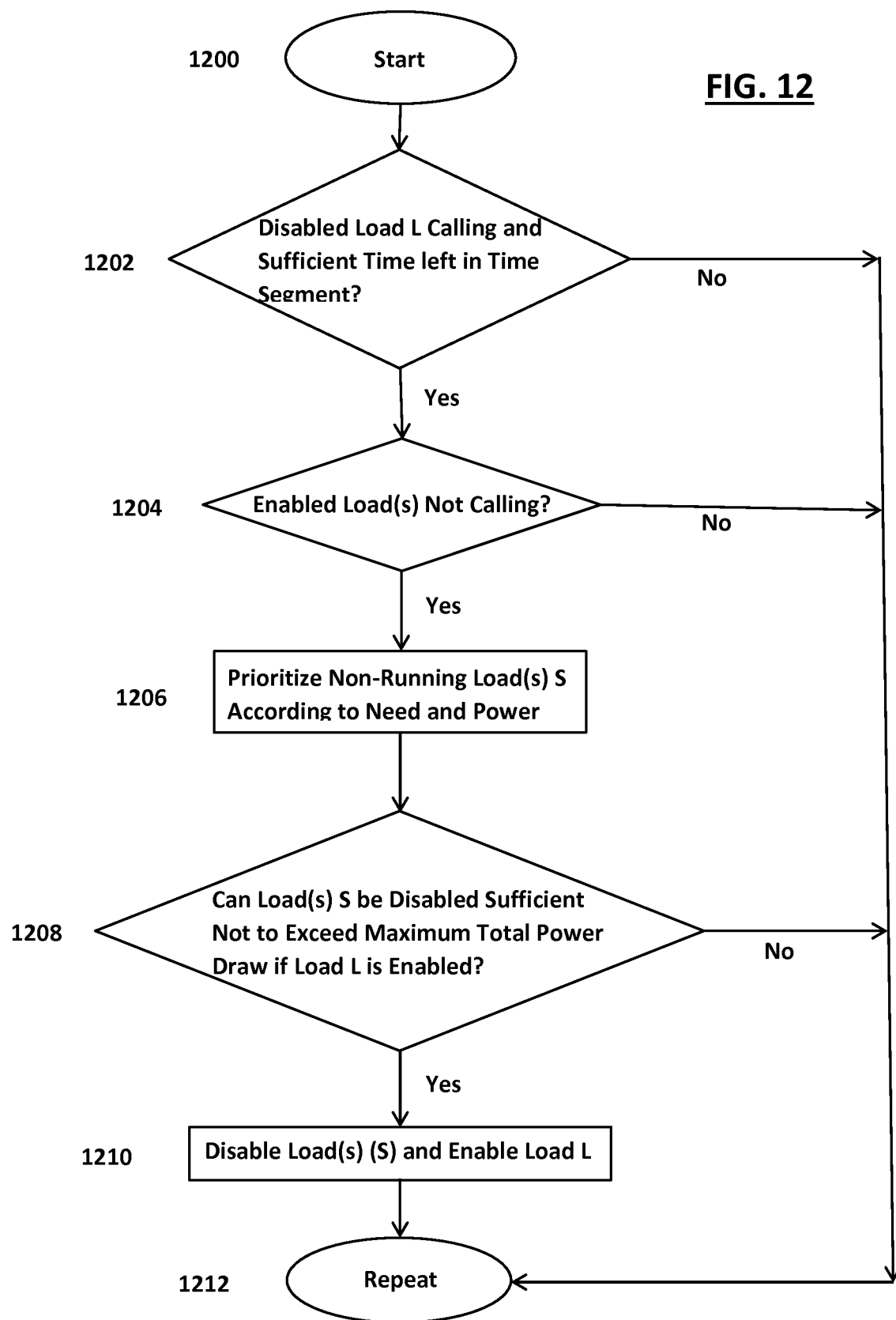
FIG. 12 shows an exemplary flowchart according to the eighth exemplary embodiment.

FIG. 12 presents an exemplary flowchart for the process as described above. The process starts at step 1200. At step 1202, a determination is made as to whether a load L in a group of loads is disabled, but calling for heating or cooling, and (optionally) for efficiency considerations, whether there is sufficient time left in the current time segment for the load to run for a minimum duration. If yes, the process proceeds to step 1204; if no, the process proceeds to step 1212 and repeats according to an appropriately frequent schedule. At step 1204, a determination is made whether there are one or more of the remaining loads within the group of loads that is enabled, but not currently calling; if no, the process proceeds to step 1212 and repeats according to an appropriately frequent schedule. If yes, the process proceeds to step 1206 where, if there are a plurality of loads S, they are prioritized according to their respective Needs (as defined above) and, secondarily, according to their power draw, whereby loads S with higher power draws are preferred over loads with lower power draws. The process then proceeds to step 1208 where a determination is made as to whether there is sufficient combined total power draw for the load or loads S, such that if these load(s) were disabled and load L enabled, any designated maximum combined power draw (e.g., a MD or DR peak level) would not be exceeded even if all the enabled loads are running simultaneously at full power. If no, the process proceeds to step 1212. If yes, then the process proceeds to step 1210, where a load S, or the minimum loads S sufficient to maintain the maximum possible total combined power draw for the group of loads below the minimum level, is/are disabled and load L is enabled. The process then proceeds to step 1212 and the process repeats. Although not expressly enumerated in the above steps, it should be understood that the process is repeated at an appropriate frequency throughout each time segment, and the load state data for the group of loads should be updated at least once prior to each time the process is performed. Obviously, it is not necessary to repeat the process if there has been no change in the load state data since the previous time the process described in FIG. 12 was carried out.

Distributed energy resources, commonly referred to as DERs, are being increasingly utilized to supplement the centralized power systems provided by traditional utilities. DER technologies are generally understood to be any type of power generation and storage resources that are typically located "behind-the-meter" at an end user's premises and operated for the purpose of supplying a significant portion, or at sometimes even all, of a customer's electric load. Such resources may also be capable of injecting power into the transmission and/or distribution system, or into a non-utility local network in parallel with the utility grid. DERs includes such technologies as solar photovoltaic (PV), combined heat and power (CHP) or cogeneration systems, microgrids, wind turbines, micro turbines, back-up generators and energy storage. To take PV as an example, these energy sources are sometimes managed by smart, network connected controllers that have much in common with Smart Thermostats. To name one example, Echelon Corporation supplies a product for controlling solar power installations called Smart-Server® that uses the LonWorks local network protocol, which can be interfaced with a BACnet/IP gateway. Thus, a COP could just a readily connect with and control a solar power PV installation by means of an Echelon Smart-Server® as with any of the various commercially available Smart Thermostats.

In circumstances where a consumer has incorporated a network connected DER into their power system, a COP can include such a DER into its overall load management strategies. In this regard, the COP can consider the DER as simply one more node in the energy network. In this case, however, the energy supplied to the system by the DER would be considered a negative load, as contrasted with energy consuming loads which are considered positive values. For example, if an air conditioning compressor at one node of the system were drawing 20 kW while at another node a PV solar panel was delivering 10 kW to the system, the net load on the system for these two devices would be 20+(−10)=10 kW. DER technologies typically operate whenever possible at their full power producing potential. For example, wind or solar power sources operate at the maximum power level dictated by wind speed or sun brightness, respectively. Accordingly, there is very little value in considering the previous energy generation levels for DERs as would be the case for energy consuming (positive) loads. For example, PV and wind turbine DERs typically deliver power levels that vary greatly over the course of a day. However, for any time segment of about ten or fifteen minutes, the supplied power level is not likely to change drastically. Thus, for DERs, the best estimate of the supplied load for any given time segment is most likely to be that of the preceding time segment, which can be taken as the expected load by the COP for demand management purposes.

Many DER installations include energy storage capability, often in the form of batteries. In such installations a choice arises as to whether to consume the DER's energy directly, or to store it for use at a later time. There are virtually an endless number of scenarios for consuming directly or storing energy, depending on the customer's use pattern, the utility's rate schedule, changing weather conditions, etc. In some instances, a choice can be made to store energy during the morning hours and return it to the system during peak energy pricing period in the afternoon. In this and most cases, the consumer's primary goal will be to minimize energy costs, which of course includes considering limiting energy consumption during peak hours, minimizing MD, and/or achieving DR target levels. Thus, the COP can incorporate DERs into its various schemes for achieving these goals as previously described, but where the DER may be considered a load that operates at the average load level observed during a previous time segment.

Consider an exemplary case where a DR event occurs requiring a user not to exceed a maximum load on the grid of 15 kW. According to a thirteenth aspect of the invention, consider a scenario wherein the user's loads include one DER load "DER" and three HVAC loads "A," "B," and "C" with associated maximum power levels "$I_{MAX}$," load enabled utilization values "LEUV," and their respective contributions "$I_{CSE}$" to a target system equilibrium as presented in the table below.

| Load ID | $I_{MAX}$ (kW) | LEUV (%) | $I_{CSE}$ (kW) |
|---|---|---|---|
| DER | 9 | 100 | 9 |
| A | 10 | 50 | 5 |
| B | 5 | 60 | 3 |
| C | 10 | 70 | 7 |
| | Target System Equilibrium | | 24 |

In this example, the output of the DER load, 9 kW in this case, is added to the target system equilibrium. Thus, instead of being limited to a total power draw of 15 kW (5+3+7=15), the consumer can use up to an average total of 24 kW for each 15 minute billing period.

Where a DER includes energy storage capacity, the COP can monitor the stored energy level (kWh) and consider using up to the full rated output capacity of a storage device's voltage inverter to increase the total amount of load delivered by the DER over a limited time period. Take, for example, a DR event that is to last for two hours, but the user wishes to consume 20 kW more than the maximum allowed load. In this case, the total energy deficit is 40 kWh. In order to allow the user to operate their facility at the desired level, the COP could use, for example, a fraction of even all of a DER's output, in advance of the DR event to ensure having at least 40 kWh of stored energy in reserve. The COP then has the ability to direct a negative load of 20 kW into the system so that the DR's target maximum load is not exceeded.

Many commercial and industrial HVAC installations include a Direct Digital Control ("DDC"), Supervisory Control and Data Acquisition ("SCADA"), or a Building Automation System ("BAS") that may include, inter alia, Smart Thermostats. DDC, SCADA, and BAS systems are typically networked using the BACnet protocol, which was specifically designed for building automation applications.

A DDC, SCADA, or BAS system would normally be configured to communicate with digital smart devices in their respective native format. In certain embodiments, the COP can be configured to control Smart Thermostats within a DDC, SCADA, or BAS system by means of an API that enables two-way communications via the respective DDC, SCADA, or BAS. This configuration is similar in many regards to the scenario wherein the COP communicates with Smart Thermostats via their respective Clouds. The various embodiments discussed above in terms of an exemplary restaurant wherein the restaurant's HVAC system may include a DDC, SCADA, or BAS energy management system that may include multiple Smart Thermostats and even multiple premises. In this circumstance, the COP orchestrates the Smart Thermostats' in conjunction with and by means of their respective DDC, SCADA, or BAS.

Operating, maintaining, and controlling a Cloud based COP requires one or more user interfaces or "UI." The UI can be co-located with the COP server or, more advantageously, located remotely with communication by means of wireless and/or hard wired networks. As with typical workstation user interfaces, the COP UI hardware may include inter alia a keyboard, mouse, display, together with a digital computer comprising a microprocessor, volatile and non-volatile memory, and various inputs and outputs for connecting to peripheral devices and communication networks. The COP UI may also include various software applications including the operating system, various tools for developing software algorithms and inputting Program parameters. The UI can also be provided with means for controlling the retrieval and storage of customer site real time and historical data relating to ambient temperature, location, and time. Of special importance is the application programming interface or "API" that provides the COP user with a common interface for interacting with Smart Thermostats across a variety of thermostat manufacturers' Cloud API's. Systems and methods for implementing agnostic API control programs that can translate the API calls initiated through the common interface to invoke the desired responses across a variety of manufacturers' Cloud Servers are well within the capabilities of persons such as systems integrators who are familiar with the contemporary programming and computer arts. By these means, the COP can provide a single UI that enables control of most or all of the tools and capabilities of the respective thermostat manufacturers' Cloud servers. The common API associated with the COP's UI may be stored and executed locally at the UI, or remotely as part of the COP server system where it can be operated remotely by the user as a virtual machine.

Remote access to the COP server may be implemented by means of a Virtual Private Network or "VPN" whereby a secure connection is established. VPNs securely connect geographically separated offices of an organization, creating one cohesive network. VPN technology enables individual Internet users to perform secure wireless transactions. It allows a computer or network-enabled device to send and receive data across shared or public networks as if it were directly connected to the private network, while benefiting from the functionality, security, and management policies of the public network. For security purposes, VPN endpoints must be authenticated before secure VPN connections can be established. Remote-access VPNs may use passwords, biometrics, two-factor authentication or other cryptographic methods. For added security, VPN's often use encrypted messaging protocols and may or may not connect via a proxy server. Major implementations of VPNs include OpenVPN and IPsec.

Figure 13:
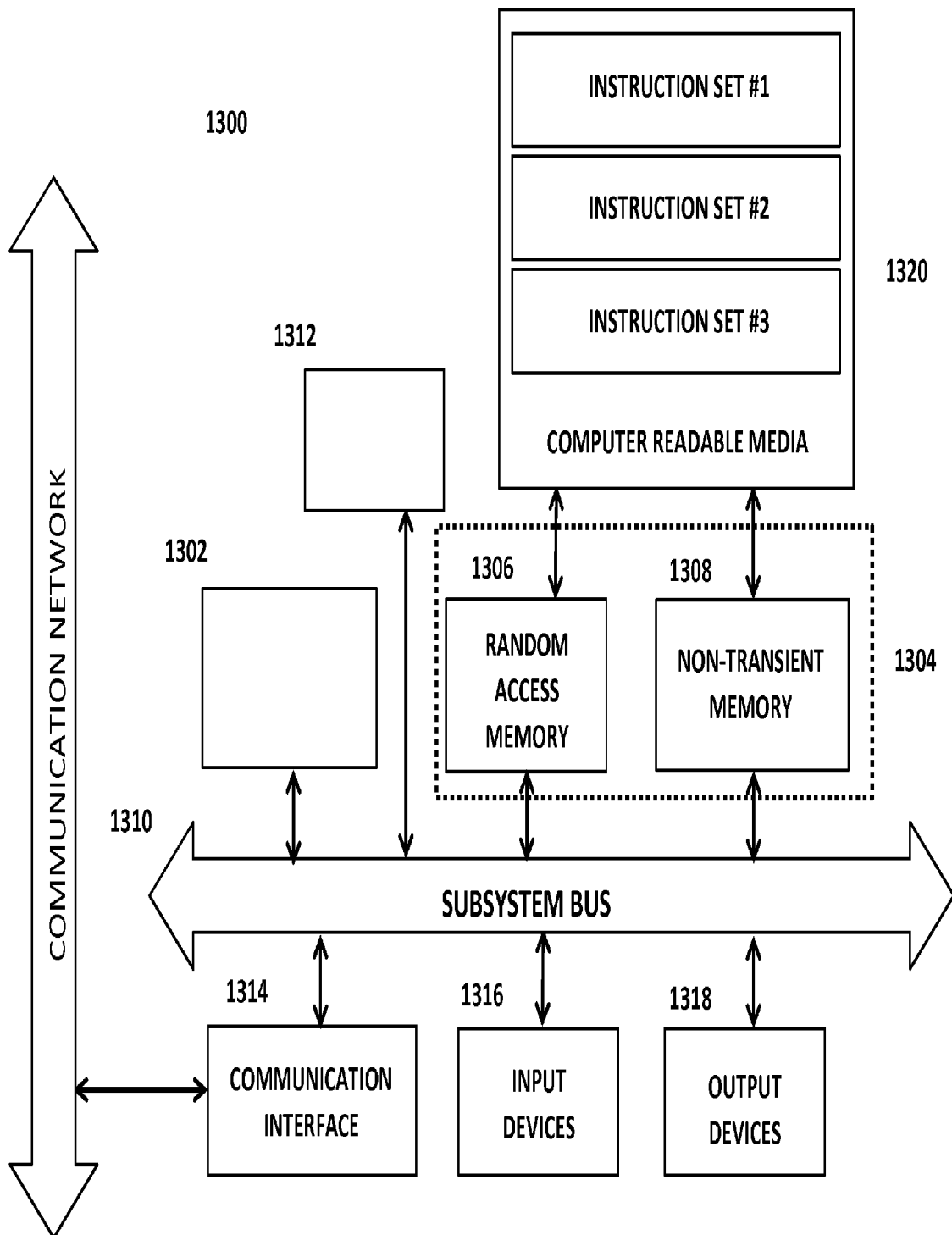
FIG. 13 shows an exemplary diagrammatic representation of a machine in the form of a computer system.

FIG. 13 depicts an exemplary diagrammatic representation of a machine in the form of a computer system 1200 within which a set of instructions, when executed, can cause the machine to perform any one or more of the methods describe above. One or more instances of the machine can operate, for example, as COP command server 22, or Cloud Service servers 20 of FIG. 2. In some embodiments, the machine may be connected (e.g., using a network 21) to other machines. In a networked deployment, the machine may operate in the capacity of a server or a client user machine in server-client user network environment, or as a peer machine in a peer-to-peer (or distributed) network environment.

The machine 1300 may comprise a server computer, a client user computer, a personal computer (PC), a tablet PC, a smartphone, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methods discussed herein.

The computer system 1200 may include any or all of a processor (or controller) 1302 (e.g., a central processing unit (CPU), a graphics processing unit (GPU, or both), a main memory 1304, a volatile memory 1306, and a tangible, non-transitory memory 1308, which communicate with each other via a bus 1310. The main memory 1204 may comprise volatile random access memory 1306 such as DRAM or SRAM, and the static non-transitory memory 1308 may comprise a Winchester drive, a solid state flash drive, or any suitable non-transitory data storage medium. The computer system 1200 may further include a display 1312; e.g., a liquid crystal display (LCD), a flat panel, or a solid state display. The computer system 1200 may include a network interface device 1314, input devices 1316 (e.g., keyboard, mouse, etc.), and output devices 1318 (e.g., a speaker, microphone, and/or printer). Some embodiments described herein can be adapted to utilize multiple display units 1312 controlled by two or more computer systems 1200. In some configurations, display images may be shown in part in a first of the display unit 1312, while the remaining portion is presented in a second of the display unit 1312. In other configurations, display images can be communicated to remotely located computer systems for display on their associated display units.

Static, tangible, non-transitory memory unit 1308 may be used to store one or more sets of instructions (e.g., software 1320) for implementing any one or more of the methods or functions described herein. Software instructions 1320 may also reside, completely or at least partially, within the main memory 1304, the static memory 1308, and/or within the processor 1302 during execution thereof by the computer system 1300. The main memory 1304 and the processor 1302 also may constitute tangible, non-volatile computer-readable storage media upon which resides, for example, the system BIOS.

While the tangible, non-volatile computer-readable storage medium 1308 is shown in an example embodiment to be a single medium, the phrase "tangible non-volatile computer-readable storage medium" should be taken to include a single medium or multiple media (e.g., a centralized or distributed database, and/or associated caches and servers) that store the one or more sets of instructions. The phrase "tangible, non-volatile computer-readable storage medium"

shall also be taken to include any non-transitory medium that is capable of storing or encoding a set of instructions for execution by the machine and that cause the machine to perform any one or more of the methods of the subject disclosure.

The phrase "tangible, non-volatile computer-readable storage medium" shall accordingly be taken to include, but not be limited to: solid-state memories such as a memory card or other package that houses one or more read-only (non-volatile) memories, magneto-optical or optical media such as an optical disk, magnetic tape, or any other tangible media which can be used to store information in an essentially permanent form. Accordingly, the disclosure is considered to include any one or more of a tangible computer-readable storage medium, as listed herein and including art-recognized equivalents and successor media, in which the software implementations of methods and systems described herein are stored.

Dedicated hardware implementations including, but not limited to, application-specific integrated circuits, programmable logic arrays and other hardware devices that can likewise be constructed to implement the methods described herein. Application-specific integrated circuits and programmable logic array can use downloadable instructions for executing state machines and/or circuit configurations to implement embodiments of the subject disclosure. Applications that may include the apparatuses and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application-specific integrated circuit or field programmable array. Furthermore, software implementations (e.g., software programs, instructions, etc.) can include, but are not limited to, distributed processing or component/object distributed processing, parallel processing, or virtual machine processing, can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, Wi-Fi, ZigBee, Z-Wave), and long-range communications (e.g., GSM, CDMA, WiMAX, LTE, etc.) can be used by computer system 1200.

The illustrations of embodiments described herein are intended to provide a general understanding of the structure of various embodiments, and they are not intended to serve as a complete description of all the elements and features of apparatuses and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Figures depicting steps according to various embodiments do not necessarily need to proceed serially as depicted and may proceed in parallel or in another order as practical considerations dictate. Accordingly, the specification and drawings are to be regarded in an illustrative rather than a restrictive sense.

Although specific embodiments have been illustrated and described herein, it should be appreciated that any arrangement or order of execution calculated to achieve the same purpose may be substituted for the specific embodiments shown. This disclosure is intended to cover any and all adaptations or variations of various embodiments. It will be appreciated that there are many further possible variations of the methods described herein, particularly in relation to more sophisticated calculation methods, and the inclusion of additional inputs. Combinations of the above embodiments, and other variations not specifically described herein but obvious to an artisan having ordinary skill in the associated arts, should be included in the subject disclosure. Possible variations include any type of load control device or system associated with a discretionary or cycling load analogous to a Smart Thermostat. Such controls are use, for example, in association with air and refrigeration compressors, electric vehicle chargers, and energy storage systems. The methods, apparatus, and systems described herein should also be understood to include control of resource distribution systems other than electric power, such as natural gas, water, etc.

What is claimed is:

1. A system for managing a plurality of energy consuming load controllers, each controlling a respective load of a plurality of loads, the system comprising:

a cloud orchestration platform configured to communicate with one or more cloud based services over a first network;

wherein each of the one or more cloud based services comprises services for one or more corresponding load controllers of the plurality of load controllers over a second network;

the cloud orchestration platform further configured to utilize the one or more cloud based services to collect load state data from the plurality of load controllers;

wherein the cloud orchestration platform utilizes the load state data to make enablement state decisions for at least one load controller of the plurality of load controllers with a goal of reducing an aggregated demand power of the plurality of load controllers; and wherein the cloud orchestration platform is further configured to reprogram one or more load controllers of the plurality of load controllers via the one or more cloud based services by means of application programming interfaces.

2. The system of claim 1, wherein the load controllers are smart thermostats.

3. The system of claim 2, wherein the load state data comprises set point, ambient temperature, and location information associated with each of the plurality of thermostats.

4. The system of claim 1, wherein the first network comprises a wide area network.

5. The system of claim 1, wherein the second network comprises a local area network.

6. The system of claim 2, wherein the cloud orchestration platform is configured to log ambient temperature and set point data versus time.

7. The system of claim 6, wherein the cloud orchestration platform is further configured to log data for the plurality of load controllers indicating when their respective loads are energized.

8. The system of claim 7, wherein the cloud orchestration platform is further configured to determine ambient temperature time rates of change values corresponding to when the respective loads are energized and when they are not.

9. The system of claim 8, wherein the cloud orchestration platform is further configured to use the ambient temperature time rates of change values to orchestrate a schedule of operation for the plurality of load controllers that reduces the aggregated demand power over some predetermined future time interval.

10. A system comprising:
a plurality of load controllers configured to operate according to respective program data residing thereon; and
a first local area communication network providing communication for the plurality of load controllers; and
a wide area communication network in communication with the first local area communication network providing communication between the first local area network and a first remote server;
wherein each load controller of the plurality of load controllers are further configured to receive data transmitted by the first remote server over the first local area communication network and wide area communication network;
wherein the first remote server is configured to transmit a change in program data to the plurality of load controllers over the first local area communication network and wide area communication network;
the plurality of load controllers configured to receive the change in program data and to update their respective program data using the received change in program data; and
wherein the first remote server is in communication with a second remote server from which the first remote server receives the change in program data.

11. The system of claim 10, wherein the plurality of load controllers comprises a first and second plurality of load controllers, the first local area network corresponding to the first plurality of load controllers and a second local area network corresponding to the second plurality of load controllers.

12. The system of claim 11, wherein the change in program data received by the first remote server comprises first and second program data, wherein the first program data is transmitted by the first remote server to the first plurality of load controllers, and the second program data is transmitted by the first remote server to the second plurality of load controllers.

13. The system of claim 10, wherein the plurality of load controllers are smart thermostats.

14. The system of claim 11, wherein the first and second remote servers communicate over the wide area communication network.

15. The system of claim 14, wherein the wide area communication network is the Internet, the first remote server is one or more cloud based servers, and the second remote server is a cloud orchestration platform.

16. The system of claim 12, wherein the first and second program data correspond to first and second load controller types.

* * * * *